(12) United States Patent
Ashizaki

(10) Patent No.: US 6,278,482 B1
(45) Date of Patent: Aug. 21, 2001

(54) METHOD FOR IMAGING A SPHERE DISPOSITION, METHOD AND APPARATUS FOR MEASURING THE SAME, AND METHOD AND APPARATUS FOR MANUFACTURING A PLANER LENS

(75) Inventor: Koji Ashizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/566,232

(22) Filed: May 5, 2000

Related U.S. Application Data

(62) Division of application No. 09/201,448, filed on Nov. 30, 1998, now Pat. No. 6,137,528.

(30) Foreign Application Priority Data

Dec. 1, 1997 (JP) .................................................... 9-330307

(51) Int. Cl.[7] .............................. H04N 7/18; G03B 21/60; B29D 11/00
(52) U.S. Cl. ............................. 348/86; 348/94; 348/125; 348/128; 382/141; 382/204; 359/452; 359/453; 264/1.7; 264/1.9; 264/2.7
(58) Field of Search ................................. 348/86, 87, 88, 348/89, 90, 92, 93–95, 125–133; 382/141–142, 144–146, 149, 151, 190, 204; 264/1.1, 1.7, 2.7, 1.9; H04N 7/18

(56) References Cited

U.S. PATENT DOCUMENTS

| | | | |
|---|---|---|---|
| 4,688,088 | * 8/1987 | Hamazaki et al. | 348/94 |
| 5,124,089 | * 6/1992 | Ohkoshi et al. | 264/1.4 |
| 5,490,084 | * 2/1996 | Okubo et al. | 348/87 |
| 5,513,275 | * 4/1996 | Khalaj et al. | 348/126 |
| 5,946,409 | * 8/1999 | Hori | 382/149 |
| 6,137,528 | * 10/2000 | Ashizaki | 348/86 |
| 6,172,814 | * 1/2001 | Watanable et al. | 359/619 |

* cited by examiner

*Primary Examiner*—Michael Lee
(74) *Attorney, Agent, or Firm*—Frommer Lawrence & Haug, LLP.; William S. Frommer

(57) ABSTRACT

A bead disposition is imaged while performing illumination by reflection illumination or penetration illumination so that a peak point of brightness brighter than the outside of a bead is observed in the inside of the bead and the circumferential portion of the bead is darker than the outside of the bead. A peak point of brightness in the inside of a bead is detected from the image data and adjacent pixels are successively painted with the peak point of brightness as a starting point, wherein the adjacent pixels have a brightness level of t2 or greater. Then, the image data is binarized. A space filling percentage of beads is calculated from the number of white or black pixels of an obtained binary image. Alternatively, binarization can also be performed after detecting a circle or circular arc pattern corresponding to a dark portion in the circumferential portion of bead from the image data by a pattern matching method and painting the inside of the circle or circular arc. In this way, the status of bead filling in a translucent screen using micro glass beads is measured.

30 Claims, 27 Drawing Sheets

F I G. 14A 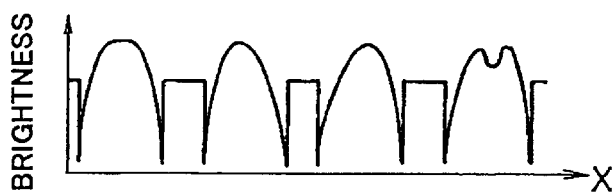
F I G. 14B 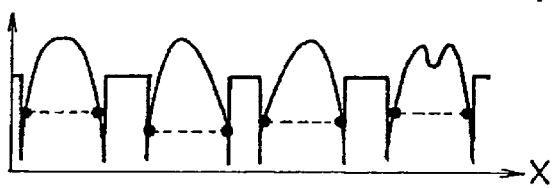
F I G. 14C 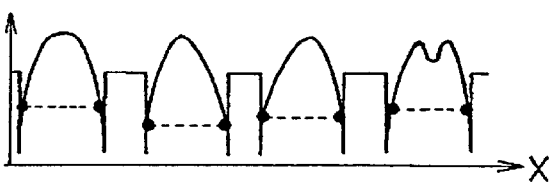
F I G. 14D 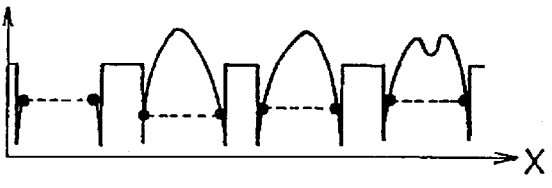
F I G. 14E 
F I G. 14F 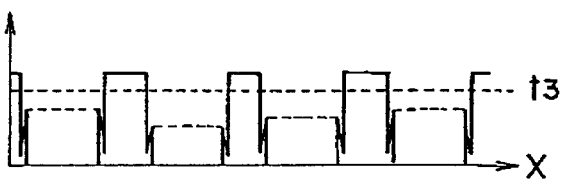
F I G. 14G
F I G. 14H 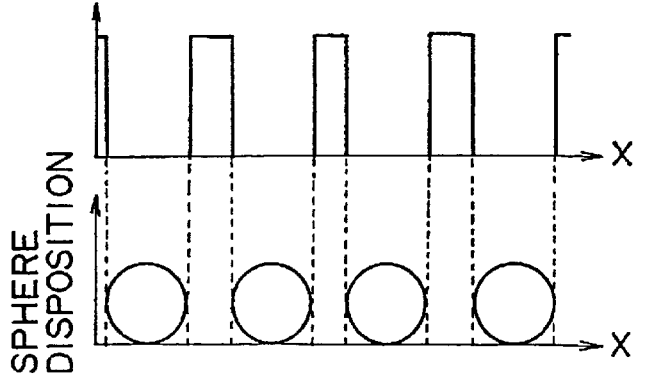

F I G. 16A
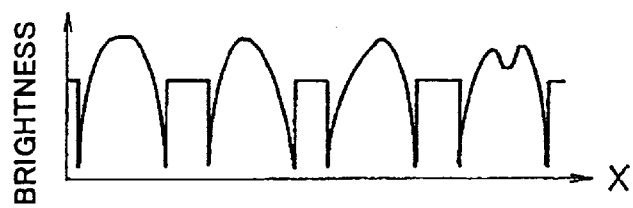
F I G. 16B
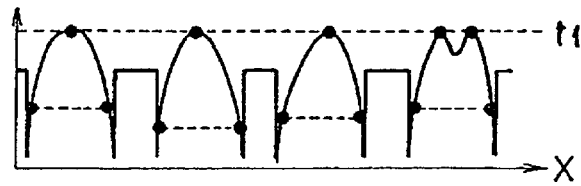
F I G. 16C
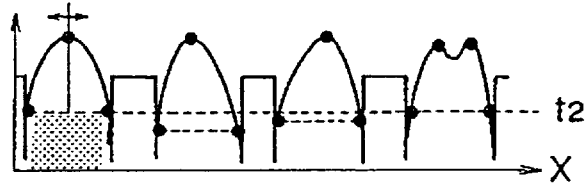
F I G. 16D
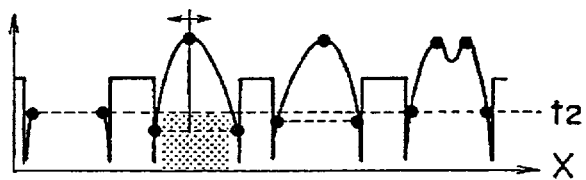
F I G. 16E
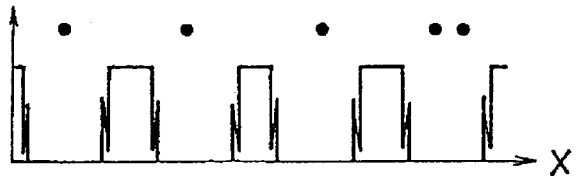
F I G. 16F
F I G. 16G
F I G. 16H
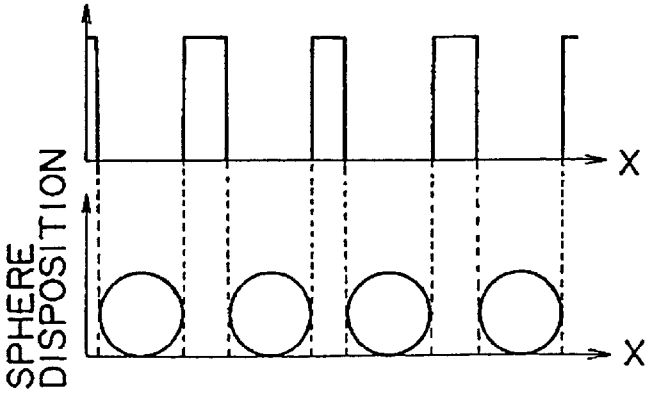

× DETECTED PEAK POINT OF BRIGHTNESS (⋯) DETECTED CIRCLE

× DETECTED PEAK POINT OF BRIGHTNESS

F I G. 20A 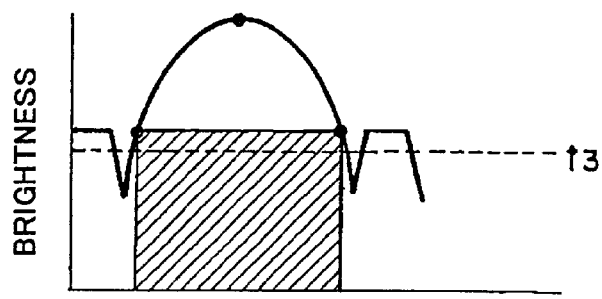
F I G. 20B 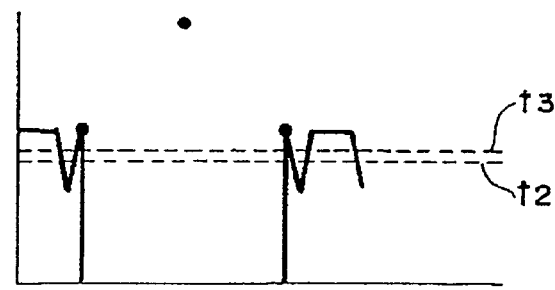
F I G. 20C 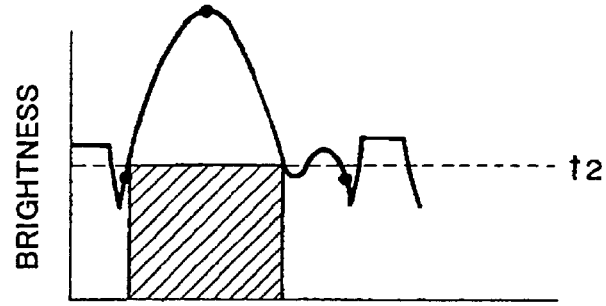
F I G. 20D 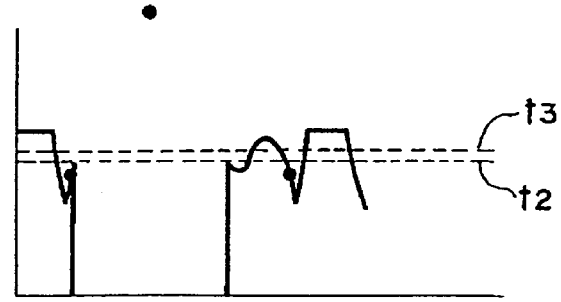

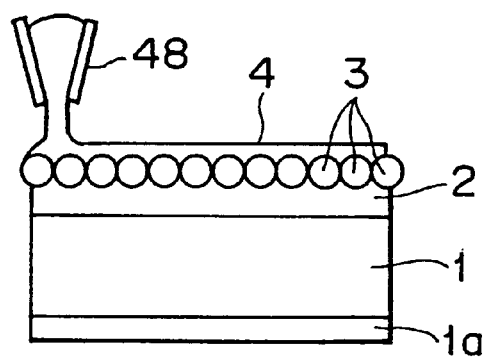
F I G. 26A
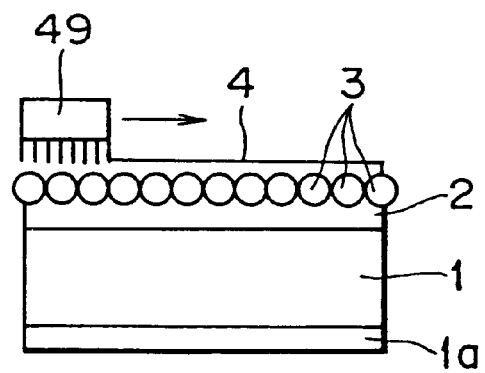
F I G. 26B
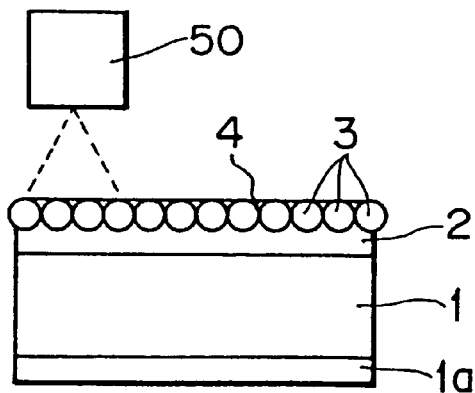
F I G. 26C

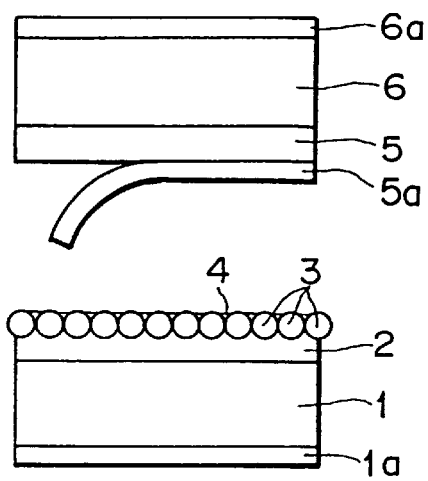
F I G. 27A
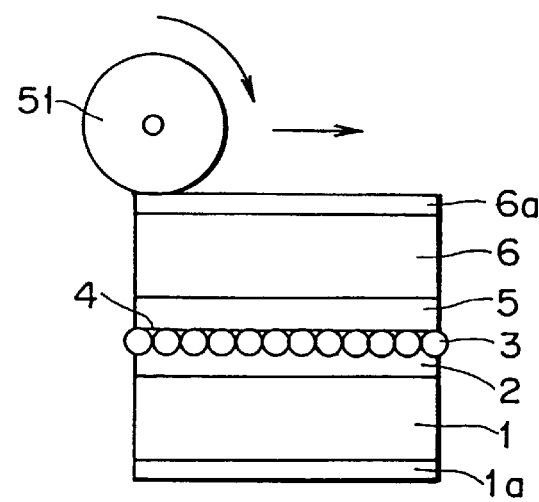
F I G. 27B
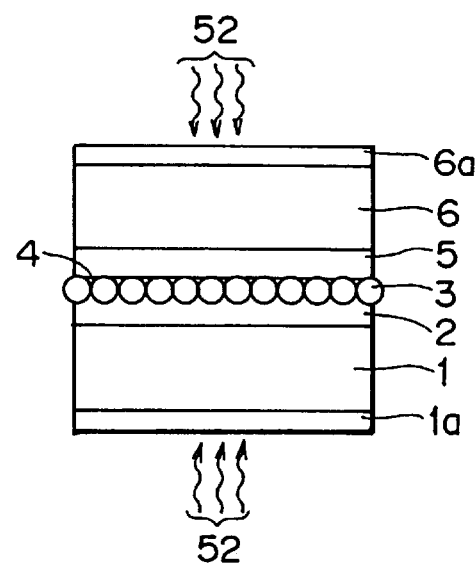
F I G. 27C

METHOD FOR IMAGING A SPHERE DISPOSITION, METHOD AND APPARATUS FOR MEASURING THE SAME, AND METHOD AND APPARATUS FOR MANUFACTURING A PLANER LENS

This application is a Divisional of application Ser. No. 09/201,448, Nov. 30, 1998, now U.S. Pat. No. 6,137,528.

BACKGROUND OF THE INVENTION

1. Field of the Invention

This invention relates to a method for imaging a sphere disposition in a planer lens and the like constructed in such a way that a plurality of transparent spheres, for example, are disposed in a single layer in a substantially plane shape, a method and an apparatus for measuring the same, and a method and an apparatus for manufacturing the planer lens.

2. Description of the Related Art

For example, some translucent screens for rear projectors (translucent or rear projection projectors) are of such a construction that a large number of transparent spheres such as glass beads are two-dimensionally disposed in a single layer and the spaces among them are filled with light absorption materials (e.g., U.S. Pat. Nos. 2,378,252 and 3,552,822, and Japanese Published Unexamined Patent Application No. Hei 3-31727, etc.).

By using such a planer lens, there can be obtained a high-performance screen which has wide viewing angles both in horizontal and vertical directions.

With such a planer lens, to improve performance attributes such as screen penetration factor, it is important that transparent spheres are disposed as densely as possible.

For example, there are disclosed in Japanese Published Unexamined Patent Application No. Hei 9-15660 a method and apparatus for dispersing a large number of minute spheres on an adhesive layer and pressing them from top by a pressure roller so as to be embedded in the adhesive layer and disposed in high density.

In the process of manufacturing such a planer lens, however, only persons have been conventionally available to observe and check the disposition of the transparent spheres and the degree of the filling. This has resulted in an increase in labor costs, leading to higher manufacturing costs.

SUMMARY OF THE INVENTION

Therefore, an object of this invention is to provide a method for imaging a sphere disposition which permits the disposition of the transparent spheres and the degree of the filling to be determined relatively easily, a method and an apparatus for measuring the same, and a method and an apparatus for manufacturing a planer lens.

To solve the above-mentioned problems, a method for imaging a sphere disposition according to this invention detects peak points of brightness having brightness of a first proper value or greater from image data obtained by photographing while illuminating a plurality of spheres disposed in a single layer in a substantially plane shape, and successively paints adjacent pixels with each of the detected peak points of brightness in the image data as a starting point, the adjacent pixels having brightness of a second proper value (the second proper value<the first proper value) or greater, then binarizes the image data painted in a proper area by using a third proper value (the second proper value<the third proper value<the first proper value) as a threshold value.

A method for imaging a sphere disposition according to another embodiment of this invention detects circle or circular arc patterns of a proper size from image data obtained by photographing while illuminating a plurality of spheres disposed in a single layer in a substantially plane shape, and paints the inside area of each of the circle or circular arc patterns detected in the image data, then binarizes the image data painted in proper areas.

A method for imaging a sphere disposition according to further another embodiment of this invention detects peak points of brightness having brightness of a first proper value or greater from image data obtained by photographing while illuminating a plurality of spheres disposed in a single layer in a substantially plane shape, detects circle or circular arc patterns of a proper size, checks for the presence of correspondences between the detected peak points of brightness and the detected circle or circular arc patterns, successively paints adjacent pixels with each of the detected peak points of brightness having a correspondence with the circle or circular arc patterns in the image data as a starting point, the adjacent pixels having brightness of a second proper value (the second proper value<the first proper value) or greater, then binarizes the image data painted in a proper area by using a third proper value (the second proper value<the third proper value<the first proper value) as a threshold value.

A method for measuring a sphere disposition according to this invention detects peak points of brightness from image data obtained by photographing while illuminating a plurality of transparent spheres disposed in a single layer in a substantially plane shape so that a peak point of brightness brighter than the outside area of each sphere is formed in the inside area thereof and a low brightness area darker than the outside area is formed in the circumferential portion thereof, then using a first proper value lower than the brightness level of the outside area of the each sphere and higher than the brightness level of the low brightness area in the circumferential portion of the each sphere in the image data, successively paints adjacent pixels with each of the peak points of brightness detected by the brightness peak point detecting means as a starting point, the adjacent pixels having brightness of the first proper value or greater, and then binarizes the image data painted in a proper area by using a second proper value between the first proper value and the brightness level of the outside area of the each sphere as a threshold value, and measures the disposition of the plurality of transparent spheres based on the obtained binary image of the image data.

A method for measuring a sphere disposition according to another embodiment of this invention detects circle or circular arc patterns of a proper size from image data obtained by photographing while illuminating a plurality of transparent spheres disposed in a single layer in a substantially plane shape so that a peak point of brightness brighter than the outside area of each sphere is formed in the inside area thereof and a low brightness area darker than the outside area is formed in the circumferential portion thereof, paints the inside area of each of the circle or circular arc patterns detected in the image data, then binarizes the image data painted in a proper area by a threshold value lower than the brightness level of the outside area of the each sphere and higher than the brightness level of the low brightness area in the circumferential portion of the each sphere, and measures the disposition of the plurality of transparent spheres based on the obtained binary image of the image data.

A method for measuring a sphere disposition according to further another embodiment of this invention detects peak points of brightness from image data obtained by photographing while illuminating a plurality of transparent spheres disposed in a single layer in a substantially plane shape so that a peak point of brightness brighter than the outside area of each sphere is formed in the inside area thereof and a low brightness area darker than the outside area thereof is formed in the circumferential portion thereof, detects circle or circular arc patterns of a proper size, checks for the presence of correspondences between the detected peak points of brightness and the detected circle or circular arc patterns, then using a first proper value lower than the brightness level of the outside area of the each sphere and higher than the brightness level of the low brightness area in the circumferential portion of the each sphere in the image data, successively paints adjacent pixels with each of the peak points of brightness having a correspondence with the circle or circular arc patterns as a starting point, the adjacent pixels having brightness of the first proper value or greater, and then binarizes the image data painted in a proper area by using a second proper value between the first proper value and the brightness level of the outside area of the each sphere as a threshold value, and measures the disposition of the plurality of transparent spheres based on the obtained binary image of the image data.

An apparatus for measuring a sphere disposition according to this invention comprises: illuminating means for illuminating a plurality of transparent spheres disposed in a single layer in a substantially plane shape so that a peak point of brightness brighter than the outside area of each sphere is formed in the inside area thereof and a low brightness area darker than the outside area is formed in the circumferential portion thereof; image input means for inputting image data obtained by photographing the plurality of transparent spheres while illuminating them by the illuminating means; brightness peak point detecting means for detecting the peak points of brightness from the image data inputted by the image input means; painting means, by using a first proper value lower than the brightness level of the outside area of the each sphere and higher than the brightness level of the low brightness area in the circumferential portion of the each sphere in the image data, for successively painting adjacent pixels with each of the peak points of brightness detected by the brightness peak point detecting means as a starting point, the adjacent pixels having brightness of the first proper value or greater; and binarizing means for binarizing the image data painted in a proper area by the painting means, by using a second proper value between the first proper value and the brightness level of the outside area of the each sphere as a threshold value, wherein the disposition of the plurality of transparent spheres is measured based on the binary image of the image data obtained by the binarizing means.

An apparatus for measuring a sphere disposition according to another embodiment of this invention comprises: illuminating means for illuminating a plurality of transparent spheres disposed in a single layer in a substantially plane shape so that a peak point of brightness brighter than the outside area of each sphere is formed in the inside area thereof and a low brightness area darker than the outside area is formed in the circumferential portion thereof; image input means for inputting image data obtained by photographing the plurality of transparent spheres while illuminating them by the illuminating means; circle (circular arc) detecting means for detecting circle or circular arc patterns of a proper size from the image data inputted by the image input means; painting means for painting the inside area of each of the circle or circular arc patterns detected by the circle (circular arc) detecting means in the image data; and binarizing means for binarizing the image data painted in a proper area by the painting means, by a threshold value lower than the brightness level of the outside area of the each sphere and higher than the brightness level of the low brightness area in the circumferential portion of the each sphere, wherein the disposition of the plurality of transparent spheres is measured based on the binary image of the image data obtained by the binarizing means.

An apparatus for measuring a sphere disposition according to further another embodiment of this invention comprises: illuminating means for illuminating a plurality of transparent spheres disposed in a single layer in a substantially plane shape so that a peak point of brightness brighter than the outside area of each sphere is formed in the inside area thereof and a low brightness area darker than the outside area is formed in the circumferential portion thereof; image input means for inputting image data obtained by photographing the plurality of transparent spheres while illuminating them by the illuminating means; brightness peak point detecting means for detecting the peak points of brightness from the image data inputted by the image input means; circle (circular arc) detecting means for detecting circle or circular arc patterns of a proper size from the image data inputted by the image input means; correspondence judgment means for checking for the presence of correspondences between the peak points of brightness detected by the brightness peak point detecting means and the circle or circular arc patterns detected by the circle (circular arc) detecting means; painting means, by using a first proper value lower than the brightness level of the outside area of the each sphere and higher than the brightness level of the low brightness area in the circumferential portion of the each sphere in the image data, for successively painting adjacent pixels with each of the peak points of brightness having a correspondence with the circle or circular arc patterns as a starting point, the adjacent pixels having brightness of the first proper value or greater; and binarizing means for binarizing the image data painted in a proper area by the painting means by using a second proper value between the first proper value and the brightness level of the outside area of the each sphere as a threshold value, wherein the disposition of the plurality of transparent spheres is measured based on the binary image of the image data obtained by the binarizing means.

A method for manufacturing a planer lens according to this invention, which is a method for manufacturing a planer lens placed in a single layer in a substantially plane shape with a plurality of transparent spheres held in an adhesive layer and includes the step of pressing the plurality of transparent spheres dispersed on the adhesive layer by a pressure means so as to be embedded in the adhesive layer, detects peak points of brightness from image data obtained by photographing while illuminating the transparent spheres so that a peak point of brightness brighter than the outside area of each sphere is formed in the inside area thereof and a low brightness area darker than the outside area is formed in the circumferential portion thereof, then by using a first proper value lower than the brightness level of the outside area of the each sphere and higher than the brightness level of the low brightness area in the circumferential portion of the each sphere in the image data, successively paints adjacent pixels with each of the peak points of brightness detected by the brightness peak point detecting means as a starting point, the adjacent pixels having brightness of the first proper value or greater, and then binarizes the image data painted in a proper area by using a second proper value between the first proper value and the brightness level of the outside area of the each sphere as a threshold value, measures a space filling percentage of the plurality of transparent spheres from the number of white or black pixels of the obtained binary image of the image data, and determines or controls the disposition of the plurality of transparent spheres based on the space filling percentage.

A method for manufacturing a planer lens according to another embodiment of this invention, which is a method for manufacturing a planer lens placed in a single layer in a substantially plane shape with a plurality of transparent spheres held in an adhesive layer and includes the step of pressing the plurality of transparent spheres dispersed on the adhesive layer by a pressure means so as to be embedded in the adhesive layer, detects circle or circular arc patterns of a proper size from image data obtained by photographing while illuminating the transparent spheres so that a peak point of brightness brighter than the outside area of each sphere is formed in the inside area thereof and a low brightness area darker than the outside area is formed in the circumferential portion thereof, paints the inside area of each of the circle or circular arc patterns detected in the image data, and then binarizes the image data painted in a proper area by a threshold value lower than the brightness level of the outside area of the each sphere and higher than the brightness level of the low brightness area in the circumferential portion of the each sphere, measures a space filling percentage of the plurality of transparent spheres from the number of white or black pixels of the obtained binary image of the image data, and determines or controls the disposition of the plurality of transparent spheres based on the space filling percentage.

A method for manufacturing a planer lens according to further another embodiment of this invention, which is a method for manufacturing a planer lens placed in a single layer in a substantially plane shape with a plurality of transparent spheres held in an adhesive layer and includes the step of pressing the plurality of transparent spheres dispersed on the adhesive layer by a pressure means so as to be embedded in the adhesive layer, detects peak points of brightness from image data obtained by photographing while illuminating the transparent spheres so that a peak point of brightness brighter than the outside area of each sphere is formed in the inside area thereof and a low brightness area darker than the outside area is formed in the circumferential portion thereof, detects circle or circular arc patterns of a proper size, checks for the presence of correspondences between the detected peak points of brightness and the detected circle or circular arc patterns, then by using a first proper value lower than the brightness level of the outside area of the each sphere and higher than the brightness level of the low brightness area in the circumferential portion of the each sphere in the image data, successively paints adjacent pixels with each of the peak points of brightness having a correspondence with the circle or circular arc patterns as a starting point, the adjacent pixels having brightness of the first proper value or greater, and then binarizes the image data painted in a proper area by using a second proper value between the first proper value and the brightness level of the outside area of the each sphere as a threshold value, measures a space filling percentage of the plurality of transparent spheres from the number of white or black pixels of the obtained binary image of the image data, and determines or controls the disposition of the plurality of transparent spheres based on the space filling percentage.

An apparatus for manufacturing a planer lens according to this invention, which is an apparatus for manufacturing a planer lens placed in a single layer in a substantially plane shape with a plurality of transparent spheres held in an adhesive layer, comprises: pressure means for pressing the plurality of transparent spheres dispersed on the adhesive layer so as to be embedded in the adhesive layer; illuminating means for performing illumination so that a peak point of brightness brighter than the outside area of the each sphere is formed in the inside area thereof and a low brightness area darker than the outside area is formed in the circumferential portion thereof; image input means for inputting image data obtained by photographing the plurality of transparent spheres while illuminating them by the illuminating means; brightness peak point detecting means for detecting the peak points of brightness from the image data inputted by the image input means; painting means, by using a first proper value lower than the brightness level of the outside area of the each sphere and higher than the brightness level of the low brightness area in the circumferential portion of the each sphere in the image data, for successively painting adjacent pixels with each of the peak points of brightness detected by the brightness peak point detecting means as a starting point, the adjacent pixels having brightness of the first proper value or greater; and binarizing means for binarizing the image data painted in a proper area by the painting means, by using a second proper value between the first proper value and the brightness level of the outside area of the each sphere as a threshold value; filling percentage measuring means for measuring a space filling percentage of the plurality of transparent spheres from the number of white or black pixels of the binary image of the image data, obtained by the binarizing means; and control means for determining or controlling the disposition of the plurality of transparent spheres based on the space filling percentage obtained by the filling percentage measuring means.

An apparatus for manufacturing a planer lens according to another embodiment of this invention, which is an apparatus for manufacturing a planer lens placed in a single layer in a substantially plane shape with a plurality of transparent spheres held in an adhesive layer, comprises: pressure means for pressing the plurality of transparent spheres dispersed on the adhesive layer so as to be embedded in the adhesive layer; illuminating means for performing illumination so that a peak point of brightness brighter than the outside area of the each sphere is formed in the inside area thereof and a low brightness area darker than the outside area is formed in the circumferential portion thereof; image input means for inputting image data obtained by photographing the plurality of transparent spheres while illuminating them by the illuminating means; circle (circular arc) detecting means for detecting circle or circular arc patterns of a proper size from the image data inputted by the image input means; painting means for painting the inside area of each of the circle or circular arc patterns detected by the circle (circular arc) detecting means in the image data; binarizing means for binarizing the image data painted in a proper area by the painting means, by a threshold value lower than the brightness level of the outside area of the each sphere and higher than the brightness level of the low brightness area in the circumferential portion thereof; filling percentage measuring means for measuring a space filling percentage of the plurality of transparent spheres from the number of white or black pixels of the binary image of the image data, obtained by the binarizing means; and control means for determining or controlling the disposition of the plurality of transparent spheres based on the space filling percentage obtained by the filling percentage measuring means.

An apparatus for manufacturing a planer lens according to further another embodiment of this invention, which is an apparatus for manufacturing a planer lens placed in a single layer in a substantially plane shape with a plurality of transparent spheres held in an adhesive layer, comprises: pressure means for pressing the plurality of transparent spheres dispersed on the adhesive layer so as to be embedded in the adhesive layer; illuminating means for performing illumination so that a peak point of brightness brighter than the outside area of the each sphere is formed in the inside area thereof and a low brightness area darker than the outside area is formed in the circumferential portion thereof; image input means for inputting image data obtained by photographing the plurality of transparent spheres while illuminating them by the illuminating means; brightness peak point detecting means for detecting the peak points of brightness from the image data inputted by the image input means; circle (circular arc) detecting means for detecting circle or circular arc patterns of a proper size from the image data inputted by the image input means; correspondence judgment means for checking for the presence of correspondences between the peak points of brightness detected by the brightness peak point detecting means and the circle or circular arc patterns detected by the circle (circular arc) detecting means; painting means, by using a first proper value lower than the brightness level of the outside area of the each sphere and higher than the brightness level of the low brightness area in the circumferential portion thereof in the image data, for successively painting adjacent pixels with each of the peak points of brightness having a correspondence with the circle or circular arc patterns as a starting point, the adjacent pixels having brightness of the first proper value or greater; binarizing means for binarizing the image data painted in a proper area by the painting means by using a second proper value between the first proper value and the brightness level of the outside area of the each sphere as a threshold value; filling percentage measuring means for measuring a space filling percentage of the plurality of transparent spheres from the number of white or black pixels of the binary image of the image data, obtained by the binarizing means; and control means for determining or controlling the disposition of the plurality of transparent spheres based on the space filling percentage obtained by the filling percentage measuring means.

BRIEF DESCRIPTION OF THE DRAWINGS

FIGS. 14A to 14H are graphs of a normalized brightness distribution for explaining the procedure of an image processing method according to a second embodiment of this invention.

FIGS. 16A to 16H are graphs of a normalized brightness distribution for explaining the procedure of an image processing method according to a third embodiment of this invention.

FIGS. 20A to 20D are graphs of a normalized brightness distribution for explaining an example of invalid detection prevented by a fifth embodiment of this invention.

FIGS. 26A to 26C are schematic cross-sectional views that show a method for manufacturing a planer lens to which this invention is applied, in the order of process.

FIGS. 27A to 27C are schematic cross-sectional views that show a method for manufacturing a planer lens to which this invention is applied, in the order of process.

DESCRIPTION OF THE PREFERRED EMBODIMENTS

Hereinafter, this invention will be described in accordance with preferred embodiments.

Figure 1:
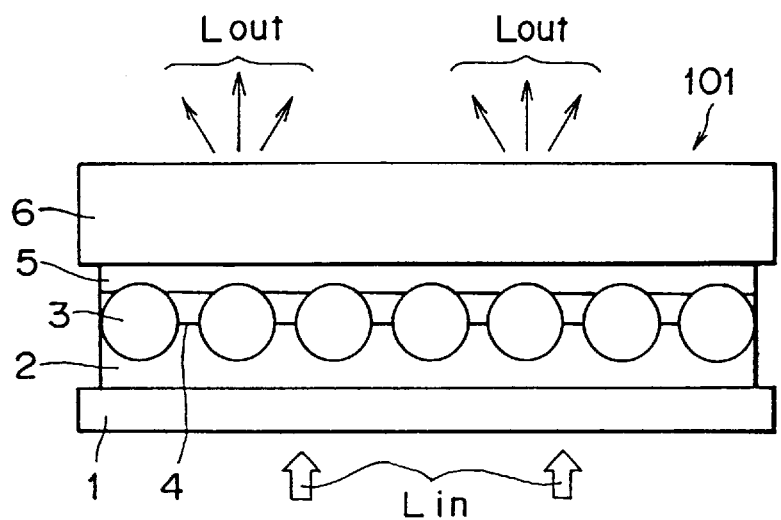
FIG. 1 is a schematic sectional view showing of the structure of a planer lens used with a translucent screen.
Figure 2:
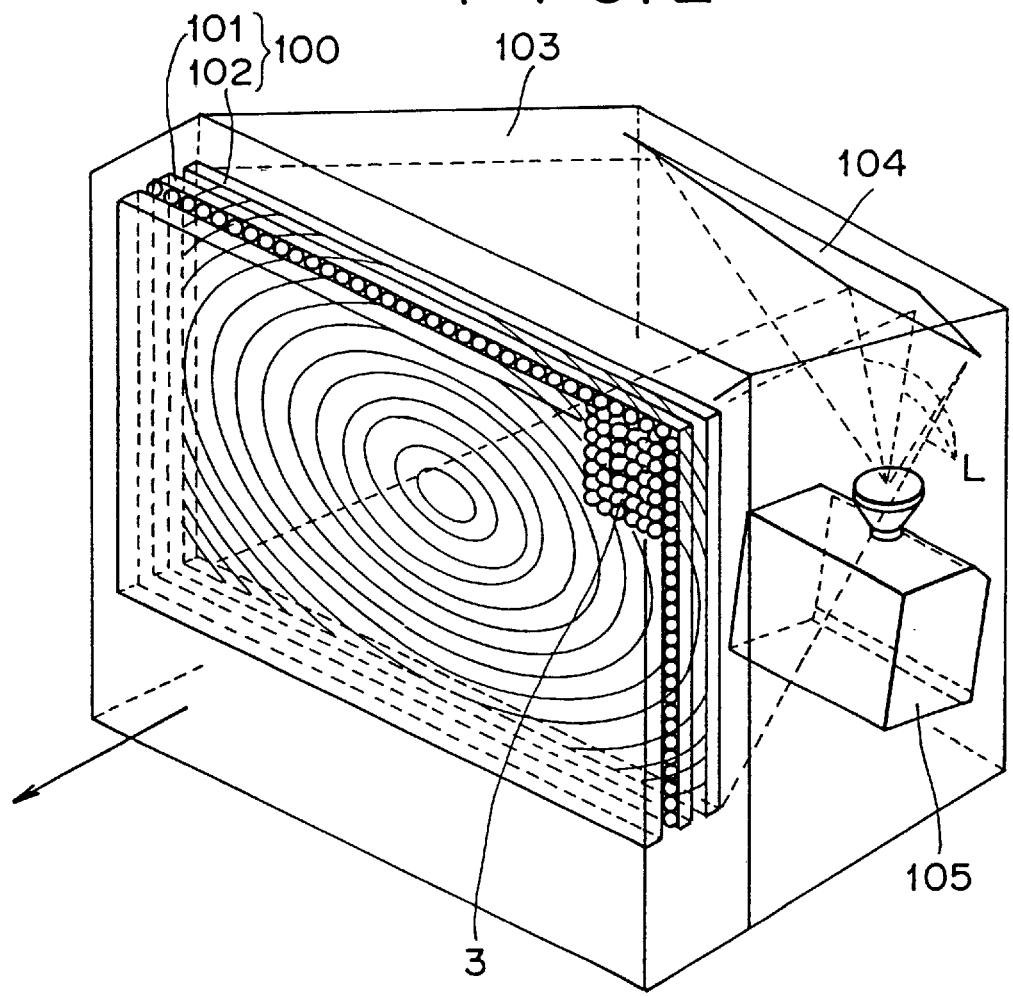
FIG. 2 is a schematic view showing the structure of a rear projector using a translucent screen.

Referring to FIGS. 1 and 2, a description will be made of a rear projection projector and a planer lens making up a translucent screen thereof.

FIG. 2 shows an example of a rear projection projector of box type. Projection image light L from an image projection section 105 disposed within a cabinet 103 is reflected by a reflection mirror 104 and is diffused forward through a translucent screen comprising a Fresnel lens 102 and a planer lens 101 constituted by a large number of transparent minute spheres 3 like glass beads.

FIG. 1 shows an enlarged sectional view of the planer lens 101. In this example, transparent minute spheres 3 are embedded about half a diameter thereof and held in a transparent adhesive layer 2 on a transparent substrate 1 of the light input side. A black light absorption layer 4 formed from carbon toner, for example, is formed in the spaces among the transparent minute spheres 3, and an area near the top of each transparent minute sphere 3 of the light output side is protruded from the light absorption layer 4. On the transparent minute spheres 3 of the light output side is stacked a transparent substrate 6 through a transparent adhesive layer 5, whereby the transparent minute spheres 3 and the light absorption layer 4 are protected from the outside.

Light Lin entering the planer lens 101 through the Fresnel lens 102 (see FIG. 2) is converged by the transparent minute spheres 3 after passing through the transparent substrate 1 of the light input side and the transparent adhesive layer 2, and the converged light passes through areas near the top of the transparent minute spheres 3 of the light output side, further through the transparent adhesive layer 5 of the light output side and the transparent substrate 6, and is diffused and outputted as output light Lout. By this arrangement, there is obtained image light having wide viewing angles both in horizontal and vertical directions of a screen.

At this time, since most external light entering from the transparent substrate 6 of the light output side is absorbed by the light absorption layer 4, contrast reduction due to reflection of the external light is prevented.

In such a planer lens 101, it is desirable in terms of improvement of penetration factor and reduction of non-uniform brightness that a large number of transparent minute spheres 3 are disposed in a plane shape as densely as possible.

Accordingly, when a large number of spheres are disposed in a plane shape, an examination will be made of the ratio (hereinafter referred to as "space filling percentage" or simply "filling percentage") of a space occupied by the sphere to a unit space of the plane.

Figure 3A:
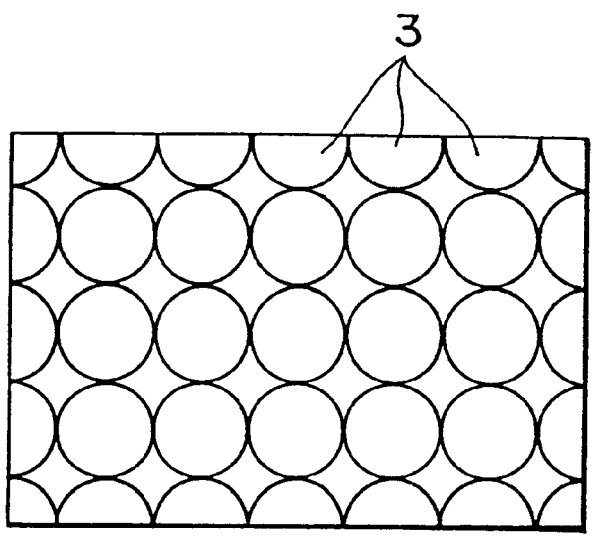
FIGS. 3A and 3B are schematic views showing a sphere disposition of square close-packed structure.
Figure 3B:
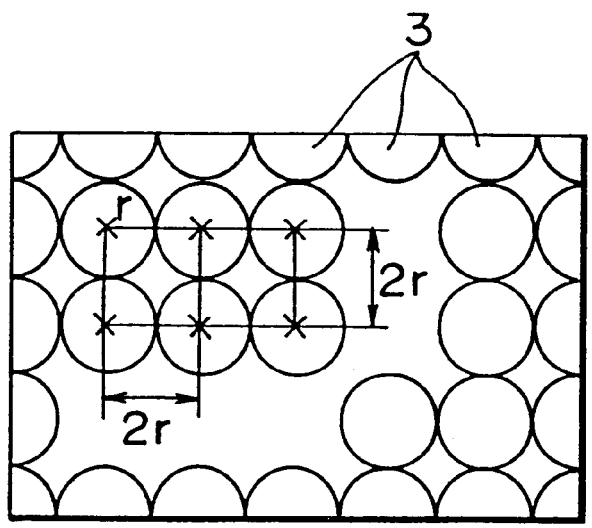

For example, as shown in FIG. 3A, in the case of so-called square close-packed structure in which spheres 3 of equal diameter are disposed so that each of central portions thereof forms a vertex of a square, as shown in FIG. 3B, if the radius of the sphere 3 is r, the space of a unit square is $4r^2$ and a space occupied by the sphere 3 is $\pi r^2$, so that the space filling percentage of the sphere 3 is $(\pi r^2/4r^2) \times 100 \approx 78.54$ [%].

Figure 4A:
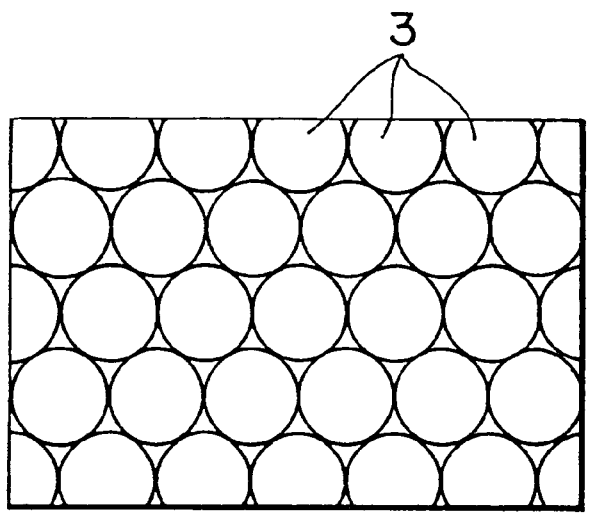
FIGS. 4A and 4B are schematic views showing a sphere disposition of hexagonal close-packed structure.
Figure 4B:
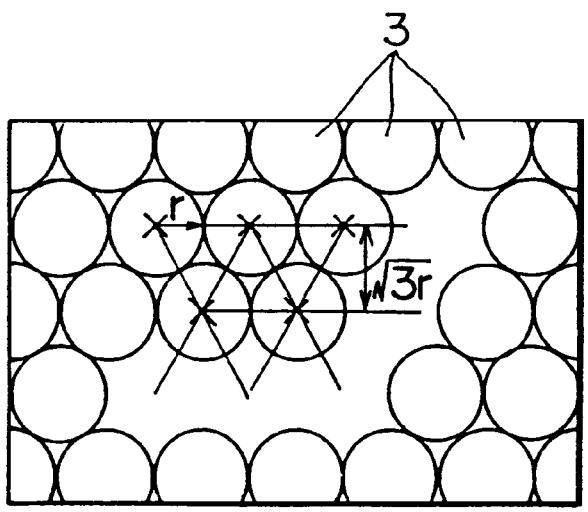

On the other hand, as shown in FIG. 4A, in the case of so-called hexagonal close-packed structure in which spheres 3 of equal diameter are disposed so that each of central portions thereof forms a vertex of an equilateral triangle, as shown in FIG. 4B, if the radius of the sphere 3 is r, the space of a unit equilateral triangle is $(\sqrt{3})r^2$ and a space occupied by the sphere 3 is $\pi r^2/2$, so that the space filling percentage of the sphere 3 is $[\pi r^2/\{2 \times (\sqrt{3}) r^2\}] \times 100 \approx 90.69$ [%]. If all of the spheres 3 have the same size, this state is the theoretical upper limit of filling percentage.

With an actual planer lens, however, glass beads and the like are somewhat different in size and, in terms of manufacturing efficiency, a large number of beads must be processed at a time instead of employing a method for securing the beads to an adhesive layer while controlling the individual positions of the beads. Optical observation of the minute spheres thus disposed shows that a large number of minute spheres of different sizes are disposed considerably randomly and without contact with each other, as shown in FIG. 6B, for example.

Therefore, individual planer lenses must be measured as to the degree of the filling.

Hereinafter, a description will be made of a method for measuring the degree of the filling and a method for imaging a sphere disposition for the measurement.

FIGS. 5A to 5D show examples of samples to be measured.

Figure 5A:
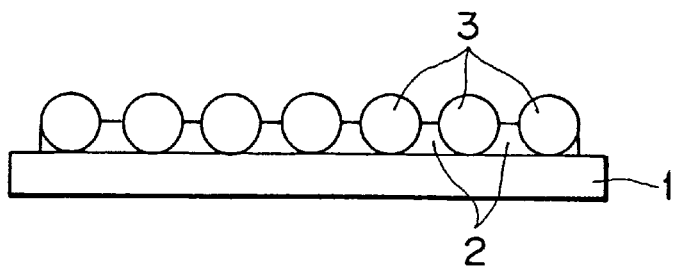
FIGS. 5A to 5D are schematic cross-sectional views showing the supporting base of sphere disposition to be subjected to image processing.

For example, as shown in FIG. 5A, spheres 3 are disposed two-dimensionally in a single layer, and secured or loosely secured on a substrate 1 by an adhesive layer 2, for example, to prevent movement due to vibration or the like.

The surface of the substrate 1 on which the spheres 3 are disposed can be somewhat curved if it can be determined to be substantially plane. Even when the surface of the substrate 1 is plane, the spheres 3 can be disposed on a surface somewhat curved by changing the depth to which each sphere 3 is embedded in the adhesive layer 2, for example.

The materials of the spheres can, in the case of planer lenses used with a translucent screen, for example, be transparent resins such as acrylic resin, vinyl chloride, and PET (polyethylene terephthalate) resin, in addition to the above-mentioned glass.

The spheres 3 can be about 1 $\mu$m to 50 mm and up to 100 mm in size when used as a target of measurement, although spheres of about 10 $\mu$m to 5 mm, for example, are used in the case of planer lenses used with a translucent screen.

As the adhesive layer 2, for example, there can be used adhesives, adhesive tapes, and double-sided tapes of various types such as solvent volatilization type, thermosetting type, and ultraviolet thermosetting type. It is desirable that the adhesive layer 2 is colorless and transparent, because characteristics are apt to develop in photographing by reflection illumination and penetration illumination. However, if the spheres 3 and the adhesive layer 2 can be observed at different brightness levels at which they are distinguishable under some illumination, for example, the adhesive layer 2 does not necessarily need to be colorless and transparent, and can be colored, for example.

Although the substrate 1 must be transparent for a planer lens used with a translucent screen, for example, it does not necessarily need to be transparent for other uses. As the substrate 1, for example, there can be used flexible films formed from glass, resin, or the like, and sheets formed from paper or cloth, in addition to rigid substrates formed from glass, resin, ceramics, metal, or the like, for example.

Figure 5B:
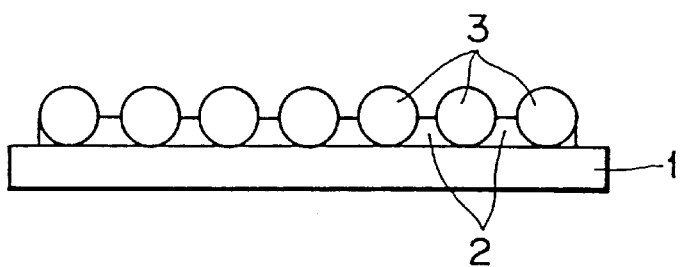
Figure 5C:
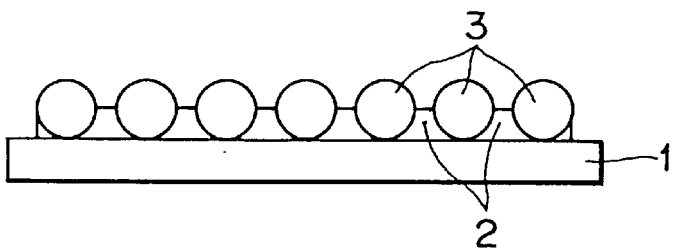
Figure 5D:
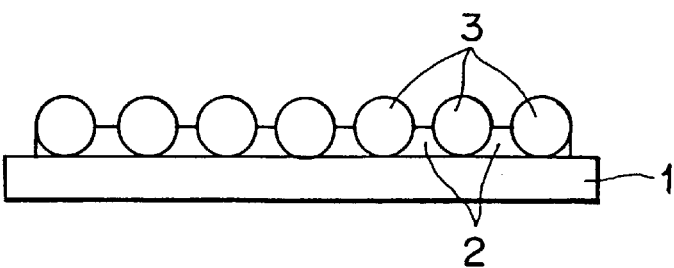

FIG. 5A shows an example that the substrate 1, adhesive layer 2, and sphere 3 all are transparent. FIG. 5B shows an example that only the substrate 3 is opaque, FIG. 5C an example that only the adhesive layer 2 is opaque, and FIG. 5D an example that both the substrate 1 and adhesive layer 2 are opaque.

The word transparent in the above description does not necessarily mean that a relevant thing is transparent in a strict sense, if it allows a substantial portion of target light to pass through it. Accordingly, the word transparent is used throughout this specification in a sense including so-called semi-transparent transparency.

Next, a description will be made of a method for performing illumination during imaging of a sphere disposition by a photo camera, TV camera, or the like.

The illumination method is broadly divided into two types: reflection illumination (also referred to as falling projection illumination) that illuminates a sample from the same direction as a camera, and penetration illumination that illuminates a sample from a direction opposite to a camera.

Figure 6A:
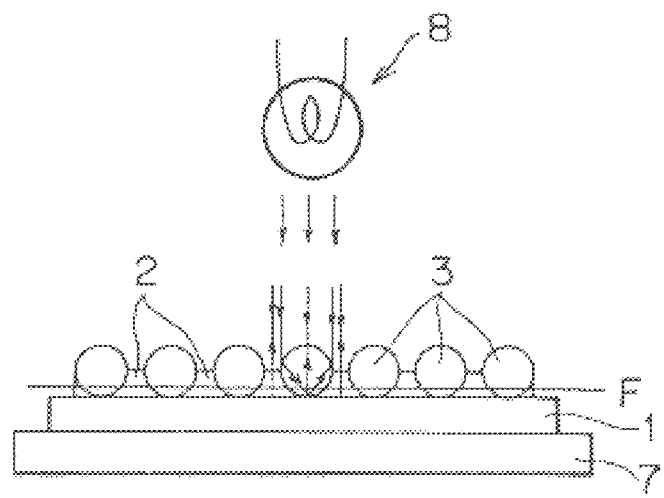
FIGS. 6A and 6B are a schematic cross-sectional view and a picture showing the principle of reflection illumination and an image obtained by reflection illumination, respectively.
Figure 6B:
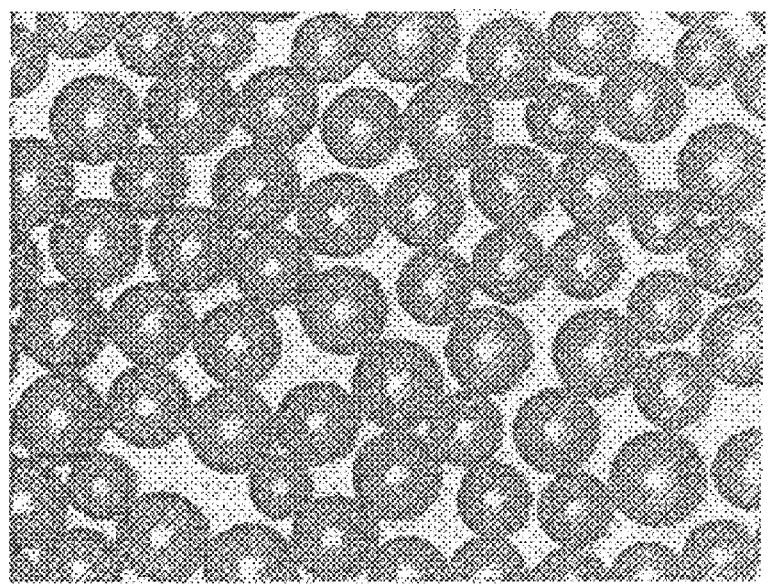

FIG. 6A shows reflection illumination that illuminates a sample comprising the substrate 1, adhesive layer 2, and spheres 3 mounted on a supporting base 7 from the direction of the spheres 3 by an illumination lamp 8. In this case, the adhesive layer 2 should be preferably transparent, while the substrate 1 can be either transparent or opaque.

Applying illumination light to such a sample causes reflection and dispersion on the mutual interfaces and individual surfaces of the substrate 1, adhesive layer 2, spheres 3, and input medium (ordinarily air), so that the reflected light and dispersed light are observed.

At this time, light hitting on the top and bottom of each sphere 3 and light hitting on other portions are different in the direction of the reflected light and dispersed light, and therefore by bringing an imaging surface into an appropriate position of the sample, a peak point of brightness is observed near the central portion of each sphere and the inside and the outside brightness of the spheres 3 are observed differently.

Namely, as shown in FIG. 6A, light from the illumination lamp 8 is converged inside each sphere 3 and not converged in other places. Accordingly, for example, if the focus surface F of camera, etc. is brought into a place between the central portion of the sphere 3 and the substrate 1 as shown in FIG. 6A, a peak point of brightness a little brighter than the outside of each sphere 3 can be observed near the central portion of the sphere 3 as shown in FIG. 6B, for example. The circumferential portion of each sphere 3 is darker than the outside thereof. Namely, it is observed that the outside of the sphere 3 is darker than the central portion thereof or has almost the same brightness as it, and is brighter than the circumferential portion of the sphere 3. Further, a sharp change in brightness is found between the circumferential portion of each sphere 3 and the outside thereof.

Figure 7A:
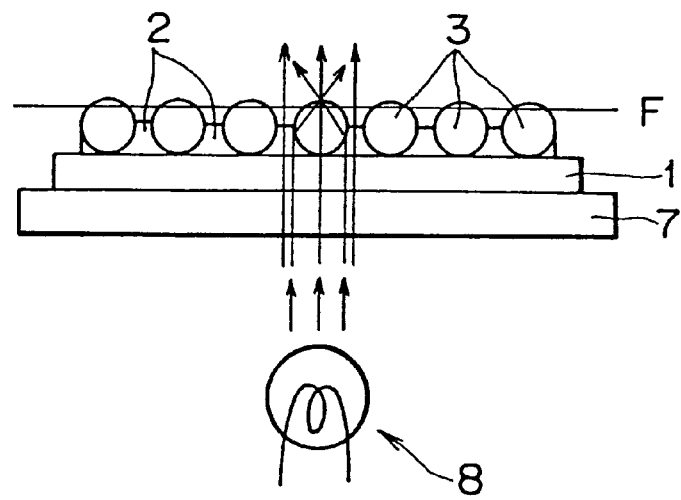
FIGS. 7A and 7B are schematic cross-sectional views showing the principle of penetration illumination.

FIG. 7A shows a case of penetration illumination. In this case, because of the differences of refraction indexes among the supporting base 7, substrate 1, adhesive 2, spheres 3, and input/output medium (ordinarily air), penetrating light is refracted on each interface, and the penetrating light and dispersed light are observed. The penetration illumination requires that both the supporting base 7 and substrate 1 be transparent (or at least semi-transparent).

At this time, light passing through the spheres 3 and light passing through other portions are different in the direction of the penetrating light and dispersed light, and therefore by bringing an imaging surface into an appropriate position of the sample, a peak point of brightness is observed near the central portion of each sphere and the inside and the outside brightness of the spheres 3 are observed differently.

Figure 7B:
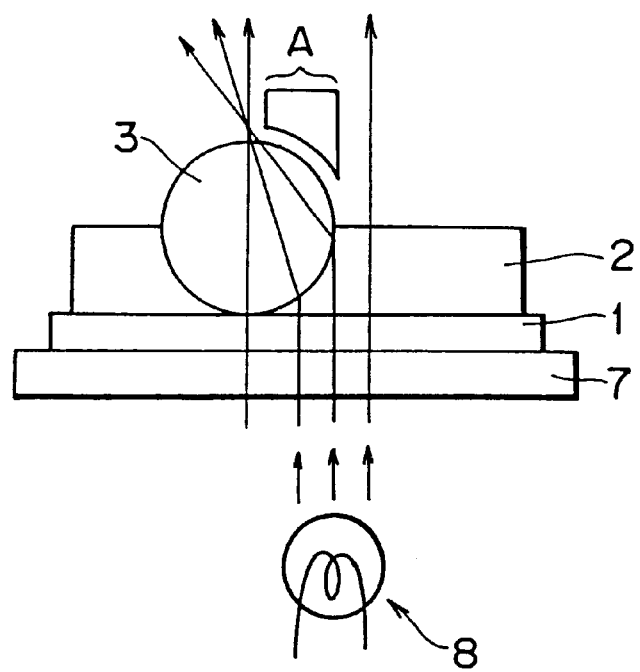

Namely, light from the illumination lamp 8, after passing through the supporting base 7 and the substrate 1, is converged within each sphere 3 and penetrates without being converged in other portions. Accordingly, by setting the focus surface F of a camera, etc. above the central portion of sphere 3, particularly near the top of sphere 3 of the light output side, almost the same image as shown in FIG. 6B can be obtained. In other words, as enlarged by FIG. 7B, light converges around the central portion of each sphere 3, so that a peak point of brightness brighter than the outside of the sphere 3 is observed, while an area A through which little light transmits is formed in the circumferential portion of each sphere 3, so that that portion appears darker than the outside of the sphere 3.

Figure 8A:
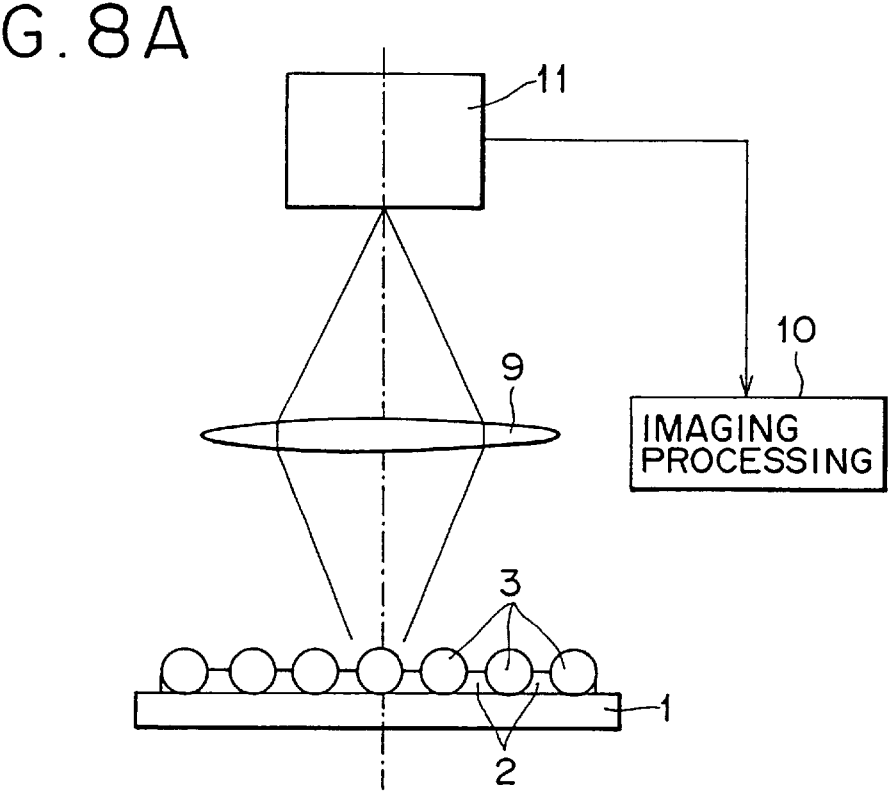
FIGS. 8A and 8B are schematic views showing a method for inputting images.
Figure 8B:
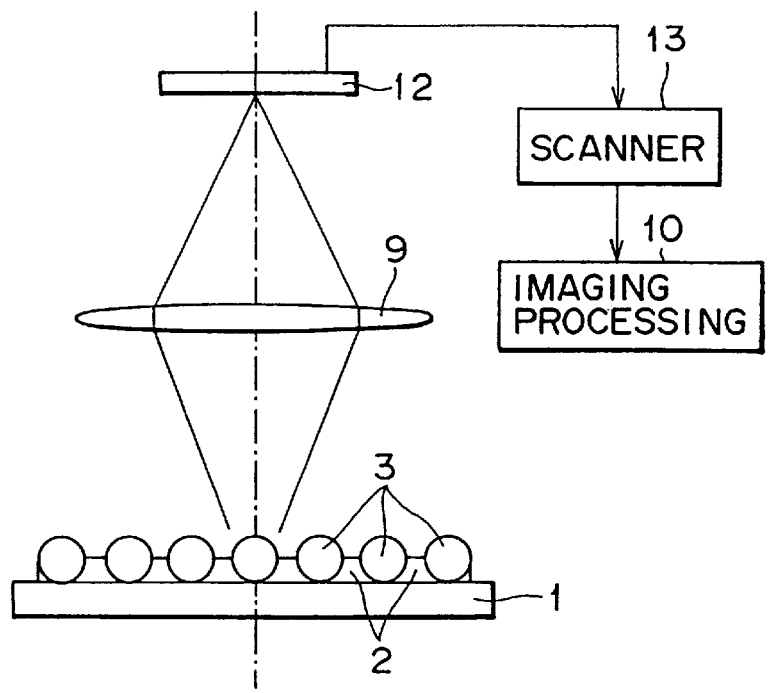

FIGS. 8A and 8B show examples of a method for converting an optical image of a sphere disposition into electrical signals and inputting them to an image processing unit.

In the example of FIG. 8A, a sample illuminated by reflection illumination or penetration illumination as described above, for example, is directly imaged by an imaging device 11 such as CCD or vidicon in a TV camera, for example, to obtain image data converted into electrical signals, through an optical system typified by an optical microscope or magnifying glass, that is, proper optical devices including a lens 9 and the like, and the image data is inputted to an image processing unit 10. The image processing unit 10 performs A/D conversion for the image data signals sent from the imaging device 11 as required, temporarily stores the results in an image memory such as a bit map memory, and then performs image processing described later.

On the other hand, in the example of FIG. 8B, a sample illuminated by reflection illumination or penetration illumination as described above, for example, is temporarily photographed on a photo film 12, for example, through an optical system typified by an optical microscope or magnifying glass, that is, proper optical devices including the lens 9 and the like. Subsequently, a picture obtained by developing the film 12 is imaged by an image scanner 13, for example, and is inputted to the image processing unit 10 after being converted into electrical signals.

As a method for converting an optical image of a sphere disposition into electrical signals and inputting them to an image processing unit 10, there have been above described two examples: one is, as shown in FIG. 8A, a method that directly produces an image by the imaging device 11 such as CCD or vidicon in a TV camera, and the other is, as shown in FIG. 8B, a method that temporarily forms a picture on the photo film 12 and produces an image by developing the picture by the image scanner 13 or the like. However, without being to limited to these methods, any method is permitted which converts an optical image into image data. Accordingly, in this specification, image data obtained by converting an optical image into electrical signals by some means is collectively referred to as "image data obtained by photographing".

When a sample is a planer lens used with a translucent screen, for example, since minute beads of 1 mm or less in diameter, for example, are used as the spheres 3 as described previously, a picture enlarged by a magnifying glass or an optical microscope is photographed or imaged. On the other hand, when the spheres 3 are relatively large, the picture, without being enlarged, is photographed or imaged using a standard lens or close-up lens (macro lens). Further, depending on the relative size of a required optical image and the imaging range of the imaging device, the optical picture may be reduced and imaged.

FIGS. 9A to 9E schematically show the relationships between brightness distribution and sphere disposition in ideal image data obtained by photographing under reflection illumination or penetration illumination already described.

FIGS. 9A to 9E show cross-sectional views of brightness distribution and sphere disposition along a curve connecting the central portions of individual spheres which is set on image data.

Figure 9A:
FIGS. 9A to 9E are graphs showing normalized brightness distributions in ideal image data and sphere dispositions corresponding to them.
Figure 9B:
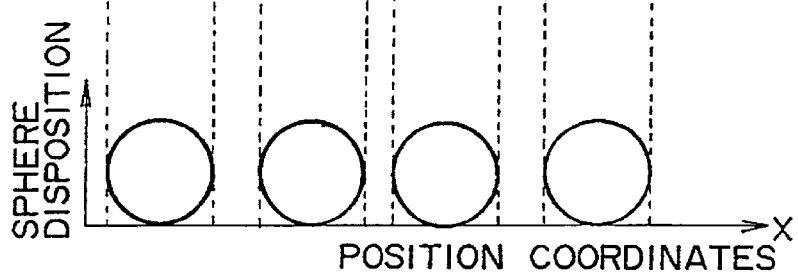

FIG. 9A shows a normalized brightness distribution in noise-free ideal image data under uniform illumination, and FIG. 9B shows a sphere disposition corresponding to it.

As shown in FIG. 9A, when photographing or imaging is performed under reflection illumination or penetration illumination already described, in each sphere, light that should ideally pass through the circumferential portion of the sphere is converged toward the central portion of the sphere. Consequently, the central portion of the sphere is observed as a peak point of brightness brighter than the outside of the sphere, and brightness decreases gradually from the central portion toward the circumferential portion of the sphere and the neighborhood of the outermost circumferential portion of the sphere is observed as a low brightness area darker than the outside of the sphere.

Figure 9C:
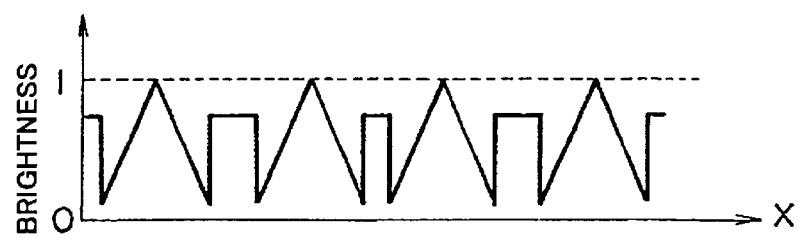
Figure 9D:
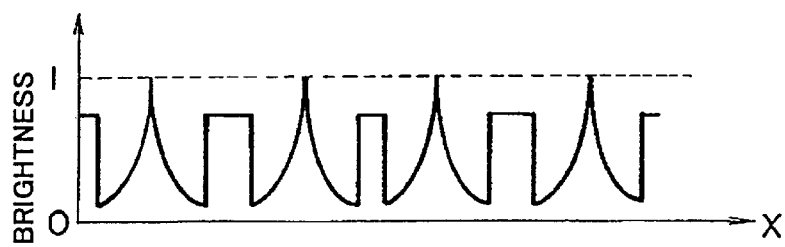
Figure 9E:
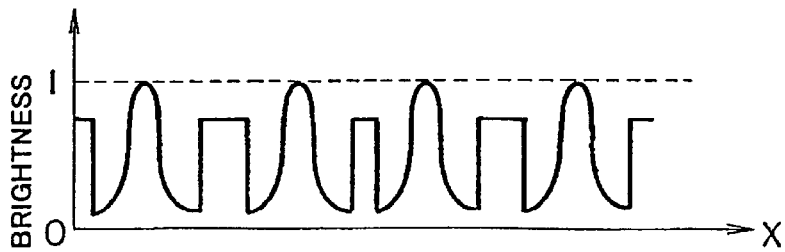

Brightness distributions shown in FIGS. 9C to 9E can be obtained by changing an illumination method, the position of an imaging surface, and the like as required.

In the example of FIG. 9C, as with the case of FIG. 9A, the central portion of each sphere is observed as a peak point of brightness brighter than the outside of the sphere, and the neighborhood of the outermost circumferential portion of each sphere is observed as a low brightness area darker than the outside of the sphere. However, brightness decreases uniformly (i.e., linearly) from the central portion of each sphere toward the circumferential portion thereof.

Also, in the example of FIG. 9B, the central portion of each sphere is observed as a peak point of brightness brighter than the outside of the sphere, and the neighborhood of the outermost circumferential portion of each sphere is observed as a low brightness area darker than the outside of the sphere. However, brightness decreases relatively sharply from the central portion of each sphere toward the circumferential portion thereof. Hence, in this example, a peak point of brightness of the central portion of each sphere can be observed relatively clearly.

Further, in the example of FIG. 9C, likewise, the central portion of each sphere is observed as a peak point of brightness brighter than the outside of the sphere, and the neighborhood of the outermost circumferential portion of each sphere is observed as a low brightness area darker than the outside of the sphere. However, brightness first decreases smoothly, then sharply from the central portion of each sphere toward the circumferential portion thereof. Hence, in this example, the circumferential portion of each sphere can be observed relatively clearly.

As described above, by simple binarizing of image data, the inside and the outside of a sphere cannot be distinguished whatever threshold value is used for the binarizing.

Accordingly, according to this invention, image processing as described below is performed to obtain a binary image allowing the distinction between the inside and the outside of a sphere.

Referring to FIGS. 10 to 12F, a description will be made of an image processing method according to a first embodiment of this invention.

Figure 10:
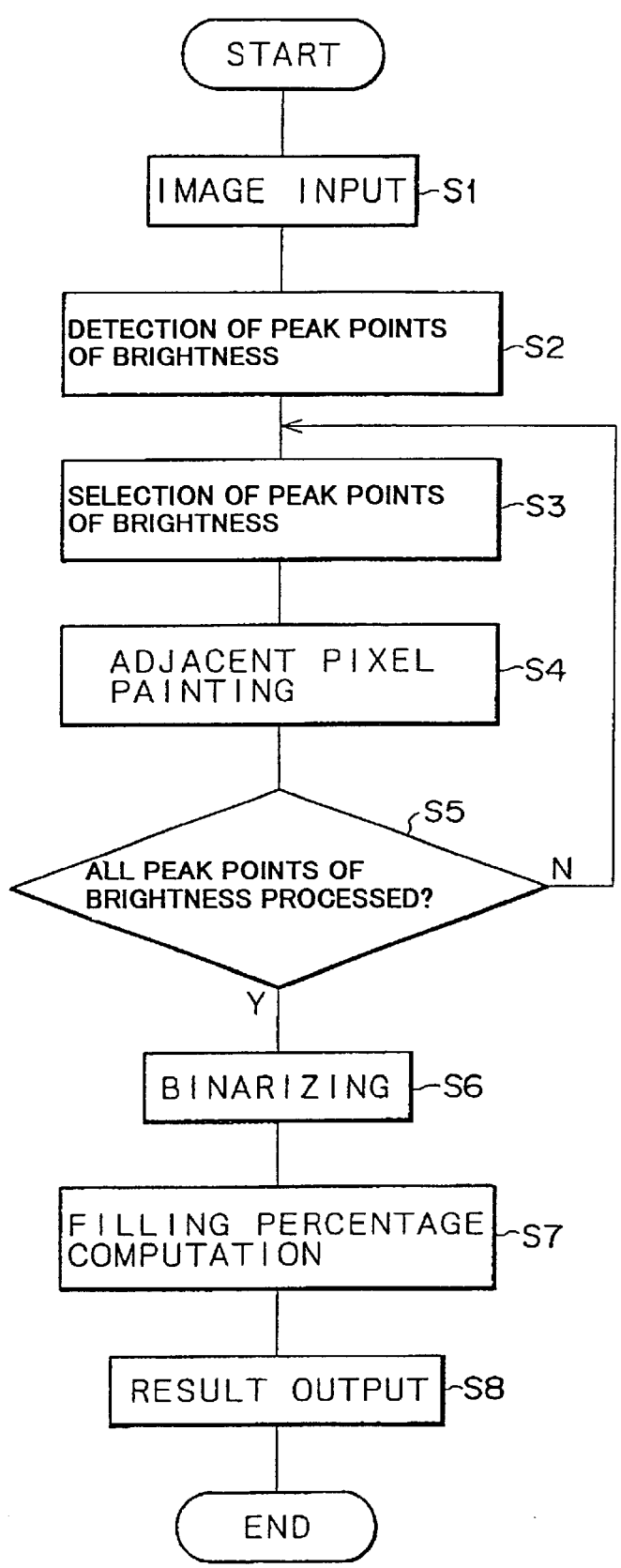
FIG. 10 is a flowchart showing the procedure of an image processing method according to a first embodiment of this invention.
Figure 11A:
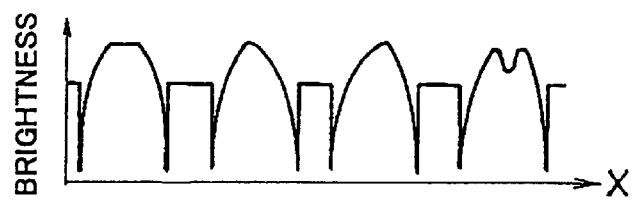
FIGS. 11A to 11H are graphs of a normalized brightness distribution for explaining the procedure of an image processing method according to a first embodiment of this invention.
Figure 11B:
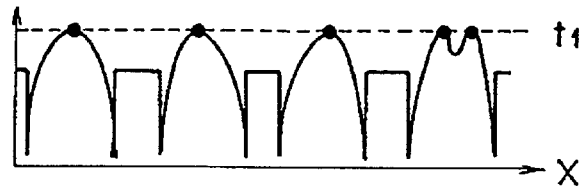
Figure 12A:
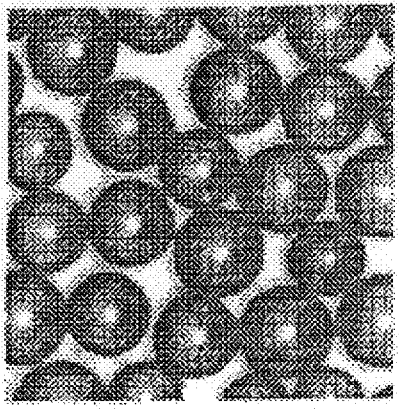
FIGS. 12A to 12F are pictures showing images processed by an image processing method according to a first embodiment of this invention.

FIG. 10 shows the flowchart of a processing procedure according to the first embodiment. In step S1, image data to be processed is inputted from the imaging device 11 (see FIG. A) or image scanner 13 (FIG. 8B) already described, for example. FIG. 11A shows an example of a normalized brightness distribution in the image data to be processed. FIG. 12A shows an actual example of an image actually inputted.

Inputted image data is temporarily stored in an image memory such as a bit map memory, for example.

Next, in step S2 of FIG. 10, peak points of brightness are detected from the image data stored in the image memory. A simple method of the brightness peak point detection is to use a threshold value t1 higher than the brightness level of the outside of a sphere and detect a portion having brightness of the t1 or greater as a peak point of brightness. As other methods, there can be used a method that detects a maximum point by performing space differentiation of brightness distribution, for example, and a method that, to avoid noise in an image, only when a pixel of a given threshold value or more occupies a given space or larger, detects the space as a peak point of brightness.

A peak point of brightness thus detected need not be in the central portion of a sphere so long as it is inside the sphere. It not problematic that two or more peak points of brightness are detected inside a sphere.

Figure 12B:
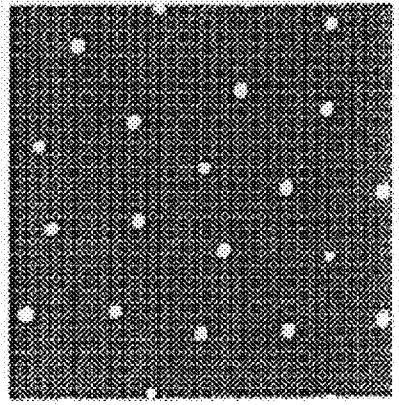
Figure 12C:
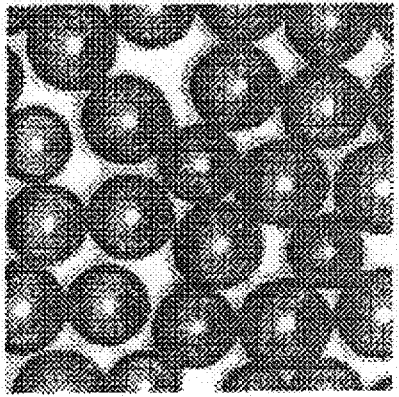

FIG. 12B shows an image of detected peak points of brightness. This image is a binary image in which a peak point of brightness is represented by white and other points by black. FIG. 12C shows an image of the peak points of brightness of the image of FIG. 12A which are enhanced by performing an operation on the image of FIG. 12A and the image of FIG. 12B. That is, the peak points of brightness are enhanced as the maximum value (white) of brightness.

Next, adjacent pixels are painted for each of the detected peak points of brightness.

Figure 11C:
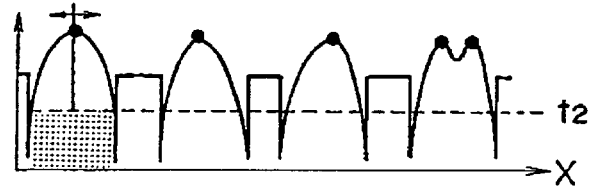

In step S3 of FIG. 10, peak points of brightness are successively selected, and in the next step S4, for example, as shown in FIG. 11C, of pixels adjacent to the selected peak point of brightness, the pixels of a threshold value t2 or more are successively painted (brightness is zeroed, for example). At this time, as t2, a proper value higher than the brightness level of a low brightness area in the circumferential portion of the sphere and lower than the brightness level of the outside of the sphere is used. Accordingly, it follows that t2<t1.

For the painted pixels, further, the brightness of adjacent pixels is determined, and the adjacent pixels are also painted in the same way if the brightness thereof is t2 or more.

In this way, by successively determining the brightness of adjacent pixels and painting them, all of relatively bright areas continuous to the peak points of brightness selected in step S3 will be painted.

Figure 12D:
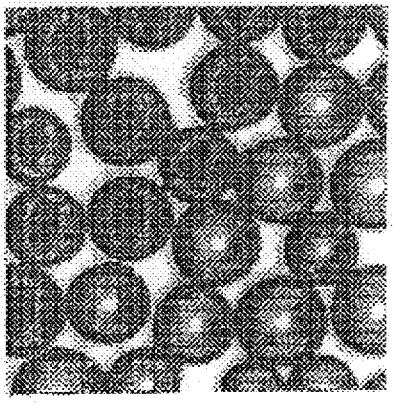

For example, FIG. 12D shows an image of spheres already painted and spheres not yet painted. The sphere group at the upper left portion has already been processed and the sphere group at the lower right portion is not yet processed.

Figure 11D:
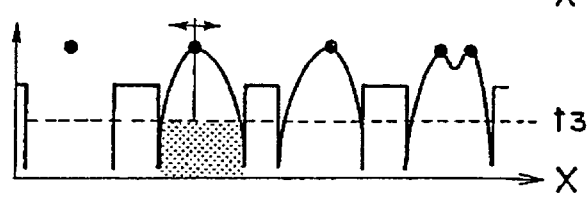

In step S5, it is determined whether adjacent pixels have been painted for all detected peak points of brightness, and if not so, the next peak point of brightness is selected as shown in FIG. 11D, for example, to perform the same adjacent pixel painting processing.

In such adjacent pixel painting processing, whether a peak point of brightness is in the central portion of each sphere exerts little influence on painting results. The existence of two or more peak points of brightness in one sphere exerts little influence on painting results, except that peak points of brightness not substantially painted may be found as a result of painting by another peak point of brightness.

Figure 11E:
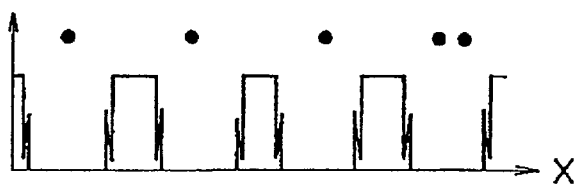
Figure 11F:
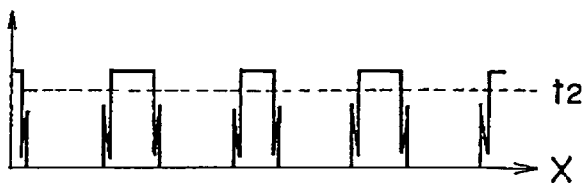
Figure 12E:
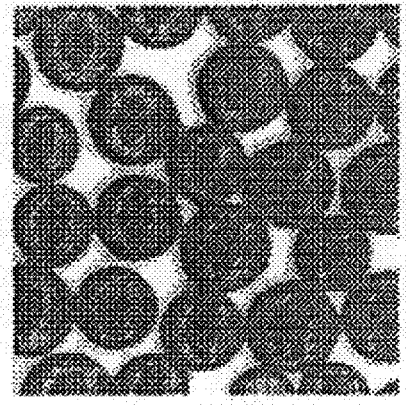

FIG. 11E shows the brightness distribution of image data after adjacent pixels have been painted on all peak points of brightness, and FIG. 12E shows an actual image.

When adjacent pixels have been painted for all detected peak points of brightness, the image data is binarized in step S6 in FIG. 10. The binarizing processing, as shown of FIG. 11F, for example, is performed using a threshold value t3 higher than the threshold value t2 used to determine brightness in the adjacent pixel painting processing and lower than the brightness level of the outside of a sphere. Therefore, the following relation is established: t2<t3<t1.

Figures 11G, 11H:
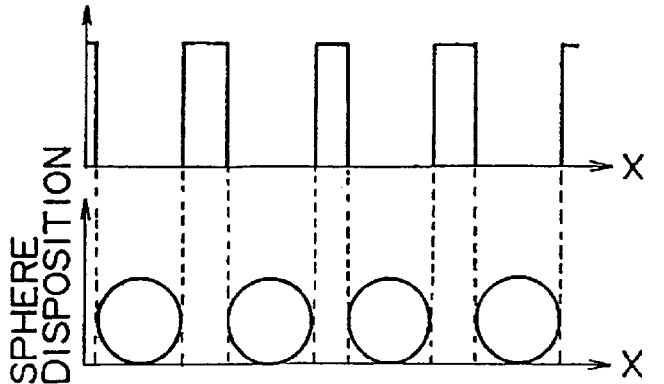

As a result of the binarizing processing, image data of a brightness distribution shown in FIG. 11G is obtained. FIG. 11H shows a corresponding sphere disposition.

Figure 12F:
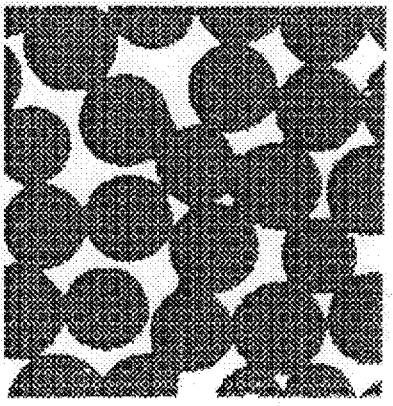

FIG. 12F shows a binary image actually obtained. This image is a binary image in which the inside of a sphere is represented by black and the outside thereof by white.

Usually, in the outer frame portion of an image range observed, since only part of spheres fit within the image as seen from FIG. 12A, for example, there are several spheres in which no peak point of brightness is detected. Since such spheres are not subjected to the above-described painting processing, pixels higher in brightness than the threshold value t3 used for binarizing processing may remain. Accordingly, to avoid this, after termination of the above-described painting processing, the outer frame portion of the image needs to be cut off by a certain width (e.g., width equivalent to a value estimated as the radius of the spheres) to reduce the image before performing binarizing processing.

In the first embodiment, in step S7 of FIG. 10, a filling percentage (space filling percentage) is calculated from the binary image obtained as described above. The filling percentage can be easily found by calculating the ratio of the number of white or black pixels to the total number of pixels of the obtained binary image. The calculation results are outputted in the next step S8.

Of course, the binary image itself can be outputted aside from calculating a filling percentage or without calculating a filling percentage.

As described above, in the first embodiment, for example, a sphere disposition in a planer lens is photographed on a photo film, then imaged by an image scanner or the like, or directly imaged by the imaging devices of CCD or the like, for example, to obtain image data, under illumination by reflection illumination or penetration illumination, for example, in such a way that a peak point of brightness brighter than the outside area of each sphere is observed in the inside area of the sphere and a low brightness area darker than the outside area thereof is observed in the circumferential portion thereof. Next, from the obtained image data, a peak point of brightness within each sphere is detected using a threshold value t1 higher than the brightness level of the outside area of the sphere, for example. Next, with the each peak point of brightness detected as a starting point, adjacent pixels are successively painted, wherein the pixels have a brightness level greater than or equal to a threshold value t2 higher than the brightness level of a low brightness area in the circumferential portion of each sphere and lower than the brightness level of the outside area thereof, for example. Subsequently, the image data painted in a proper area within the each sphere is binarized by a threshold value t3 higher than t2 and lower than the brightness level of the outside area of the sphere, for example. A filling percentage is calculated from the obtained binary image, and the binary image is outputted as required.

Hence, according to the first embodiment, a binary image allowing the distinction between the inside and the outside of a sphere can be relatively easily obtained, and a filling percentage can be easily calculated using the binary image, for example. A peak point of brightness does not need to be in the central portion of a sphere so long as it is inside the sphere. Further, since a plurality of peak points of brightness may be detected for one sphere, detection of peak points of brightness can be performed considerably roughly in comparison with a method that requires that a peak point of brightness be detected correctly in the central portion of each sphere, for example. Also, influence of noise rarely develops.

Next, referring to FIG. 13 and FIGS. 14A to 14H, a description will be made of an image processing method according to a second embodiment of this invention.

Figure 13:
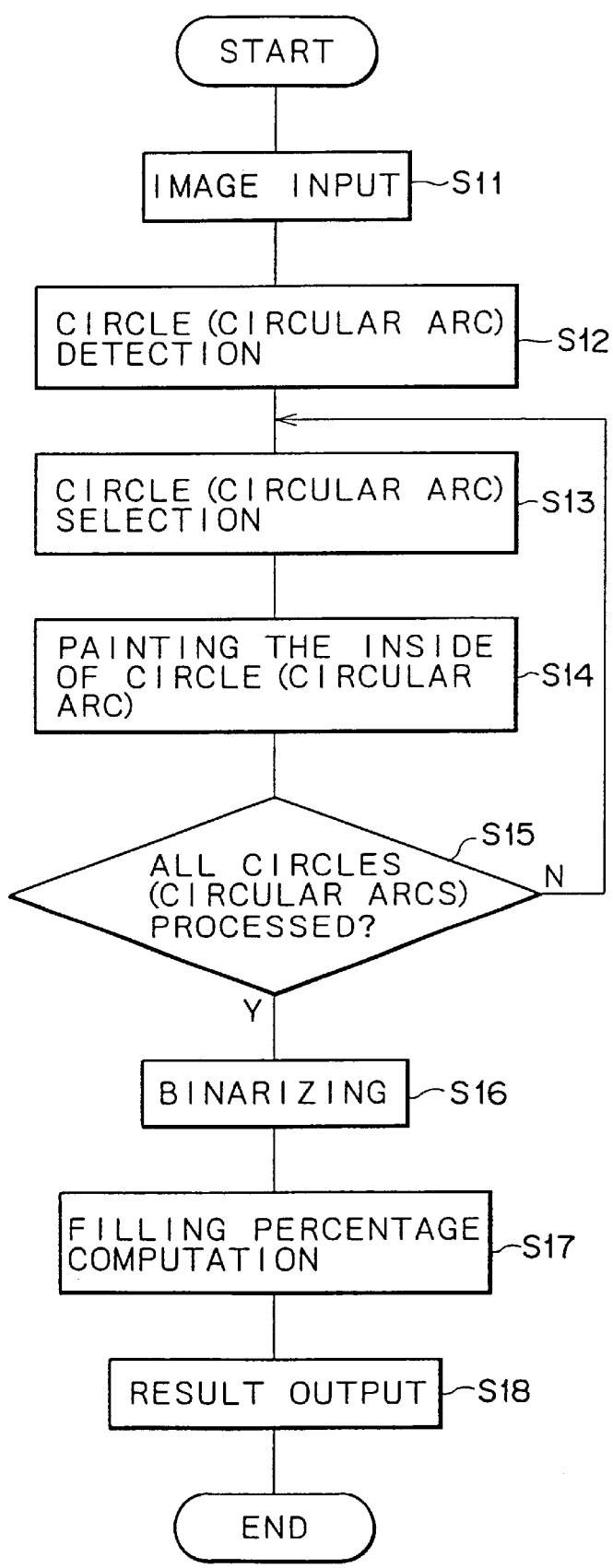
FIG. 13 is a flowchart showing the procedure of an image processing method according to a second embodiment of this invention.

FIG. 13 shows the flowchart of a processing procedure according to the second embodiment. In step S11, like the above-mentioned first embodiment, image data to be processed is inputted. FIG. 14A shows an example of a normalized brightness distribution in the image data to be processed.

Next, in the second embodiment, in step S12 of FIG. 13, a circle or circular arc pattern of a proper size is detected from the image data.

The detection of a circle or circular arc pattern is intended to detect a circle or circular arc pattern in the circumferential portion of each sphere in an image as shown in FIG. 12A, for example. The Hough conversion technique and pattern matching techniques, for example, can be used for the detection. With template matching, for example, which is the most basic technique of pattern matching, a coefficient factor is found while moving the template image of a circle or circular arc pattern to be detected, relative to a detected image, and a location where the coefficient factor is maximum is found.

In this case, if sizes are classified in advance and spheres of known sizes are to be observed, detection processing can be performed relatively quickly and with resistance to influence of noise, by using circle or circular arc patterns of sizes estimated from the spheres. By detecting a circle or circular arc pattern a little smaller than a size estimated from each sphere, relative to the circumferential portion of each sphere, the outside changes sharply in brightness, while the inside changes smoothly in brightness, so that a smaller circle or circular arc is relatively easily detected in the inside of each sphere and can be correctly detected. Further, arrangements can also be made so that a plurality of circle or circular arc patterns a little smaller than a size estimated from each sphere are detected at mutually different positions in the inside of one sphere.

FIG. 14B shows circle or circular arc patterns detected from image data.

Next, for each of detected circle or circular arc patterns, the inside area thereof is painted.

That is, first, in step S13 of FIG. 13, circle or circular arc patterns are successively selected, and in the next step S14, as shown in FIG. 14C, for example, all pixels in the inside area of the selected circle or circular arc patterns are painted.

In the next step S15, it is determined whether painting processing has been performed for all detected circle or circular arc patterns, and if not so, the next circle or circular arc pattern is selected as shown in FIG. 14D, for example, to perform the same painting processing.

By the painting processing for circle or circular arc patterns, all of relatively bright portions in the inside area of each sphere are painted. At this time, when a plurality of circle or circular arc patterns exist in one sphere, an area corresponding to a logical sum of the circle or circular arc patterns is painted. Accordingly, as a method for detecting circle or circular arc patterns, detecting in advance a large number of patterns of half circle, one-third circle, etc. in addition to full circles at mutually different positions is advantageous in that a relatively bright portion in the inside area of each sphere can be correctly painted. However, detecting circular arcs with too small a central angle tends to cause invalid detection outside the inside of sphere.

FIG. 14E shows the brightness distribution of image data after painting processing has been performed for all circle or circular arc patterns.

When painting processing for all detected circle or circular arc patterns terminates, the image data is binarized in step S16 of FIG. 13. The binarizing processing, as shown in FIG. 14F, for example, is performed using a threshold value t3 higher than the brightness level of a low brightness area in the circumferential portion of each sphere and lower than the brightness level of the outside of the sphere.

As a result of the binarizing processing, image data of a brightness distribution as shown in FIG. 14G, for example, is obtained. FIG. 14H shows a corresponding sphere disposition.

As described in the first embodiment, usually, in the outer frame portion of an image range observed, there are several spheres, only part of which fit within the image. In such spheres, neither circle nor circular arc patterns may be detected, in which case pixels higher in brightness than the threshold value t3 used for binarizing processing may remain because the above-described painting processing is not performed. Accordingly, to avoid this, after termination of the above-described painting processing, the outer frame portion of the image needs to be cut off by a certain width (e.g., width equivalent to a value estimated as the radius of the spheres) to reduce the image before performing binarizing processing.

Also in the second embodiment, like the above-mentioned first embodiment, in step S17 of FIG. 13, a filling percentage (space filling percentage) is calculated from the obtained binary image. The calculation results are outputted in the next step S18.

Of course, the binary image itself can be outputted aside from calculating a filling percentage or without calculating a filling percentage.

As described above, also in the second embodiment, for example, a sphere disposition in a planer lens is photographed on a photo film, then imaged by an image scanner or the like, or directly imaged by the imaging devices of CCD or the like, for example, to obtain image data, under illumination by reflection illumination or penetration illumination, for example, in such a way that a peak point of brightness brighter than the outside area of each sphere is observed in the inside area of the sphere and a low brightness area darker than the outside area thereof is observed in the circumferential portion thereof. Next, from the obtained image data, a peak point of brightness within each sphere is detected using a threshold value t1 higher than the brightness level of the outside area of the sphere, for example. Next, according to the second embodiment, from the obtained image data, a circle or circular arc pattern corresponding to the circumferential portion of a sphere, for example, is detected by a pattern matching technique, for example. Next, all pixels in the inside area of the detected circle or circular arc pattern are painted. Subsequently, the image data painted in the proper area is binarized by a threshold value t3 higher than the brightness level of a low brightness area in the circumferential portion of each sphere and lower than the brightness level of the outside area of the sphere, for example. A filling percentage is calculated from the obtained binary image, and the binary image is outputted as required.

Hence, also according to the second embodiment, a binary image allowing the distinction between the inside and the outside of a sphere can be obtained, and a filling percentage can be easily calculated using the binary image, for example.

Next, referring to FIGS. 15 to 17B, a description will be made of an image processing method according to a third embodiment of this invention.

Figure 15:
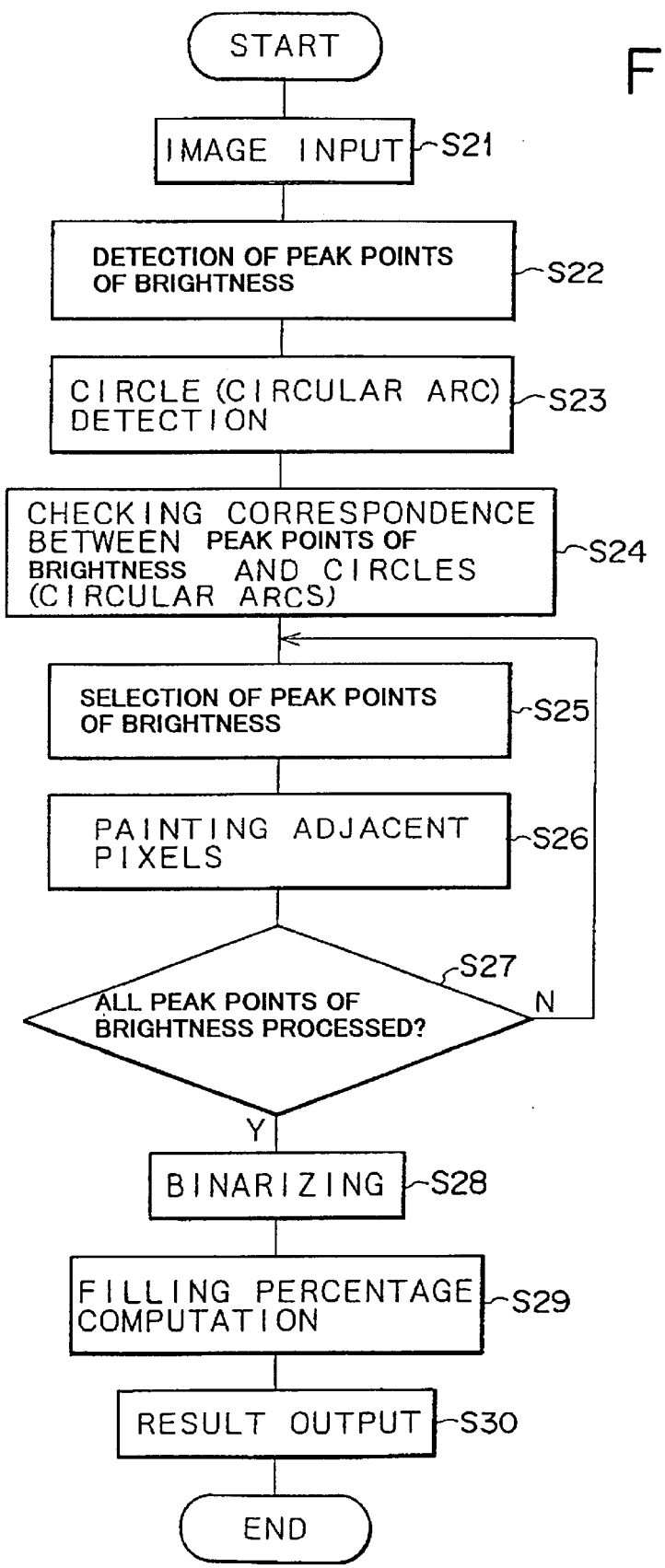
FIG. 15 is a flowchart showing the procedure of an image processing method according to a third embodiment of this invention.

FIG. 15 shows the flowchart of a processing procedure according to the third embodiment. In step S21, like the above-mentioned first and second embodiments, image data to be processed is inputted. FIG. 16A shows an example of a normalized brightness distribution in the image data to be processed.

Next, in the third embodiment, in step S22 of FIG. 15, like the above-mentioned first embodiment, peak points of brightness are detected using a threshold value t1 higher than the brightness level of the outside of spheres.

Next, in step S23 of FIG. 15, like the above-mentioned second embodiment, circle or circular arc patterns are detected.

The order of the detection of peak points of brightness and the detection of circle or circular arc patterns can be reversed.

Next, according to the third embodiment, in step S24, the correspondences between the detected peak points of brightness and circle or circular arc patterns are checked. Specifically, for example, it is determined for each of the detected peak points of brightness whether there is at least one circle or circular arc pattern that contains them in an inside area thereof. Peak points of brightness not contained in any circle or circular arc pattern, if any, are deleted from data of peak points of brightness.

Figure 17A:
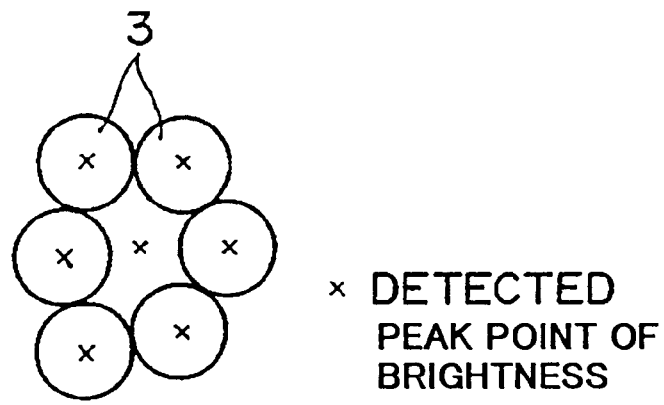
FIGS. 17A and 17B are schematic views showing examples of invalid detection.

By this process, for example, as shown in FIG. 17A, a peak point of brightness (mark x) detected due to noise in the outside of a sphere 3 although no circle is detected can be discarded as invalid detection.

To determine the correspondences between peak points of brightness and circle or circular arc patterns, it has only to be checked whether a peak point of brightness is in the inside area of a circle or circular arc pattern. However, for example, arrangements can also be made so that it is checked whether a peak point of brightness is in the central portion of a circle or circular arc pattern. This is achieved, for example, by finding the central position of a circle or circular arc pattern and checking whether the distance between the central position and a peak point of brightness is within a certain error range (e.g., within a tenth to a fifth of the sphere diameter). By this arrangement, the number of peak points of brightness to be subjected to painting processing later can be reduced to a certain value, so that painting processing can be sped up.

Next, for each of peak points of brightness having a correspondence with the circle or circular arc patterns, like the first embodiment, adjacent pixels are painted.

That is, in step S25 of FIG. 15, peak points of brightness are successively selected, and in the next step S26, for example, as shown in FIG. 16C, of pixels adjacent to the selected peak point of brightness, the pixels of a threshold value t2 or more are successively painted, wherein t2 is higher than the brightness level of a low brightness area in the circumferential portion of the sphere and lower than the brightness level of the outside of the sphere.

For the painted pixel, further, the brightness of adjacent pixels is determined, and the adjacent pixels are also painted in the same way if the brightness thereof is t2 or more.

In the next step S27, it is determined whether adjacent pixel painting processing has been performed for all peak points of brightness having a correspondence with the circle or circular arc patterns, and if not so, the next peak point of brightness is selected as shown in FIG. 16D, for example, to perform the same adjacent pixel painting processing.

As a variant of the third embodiment, arrangements can also be made so that the above-mentioned adjacent pixel painting processing is performed only in the inside of a detected circle or circular arc pattern.

In this case, in step S24 to check the correspondences between peak points of brightness and circle or circular arc patterns, a check for invalid detection is made for each of detected circle or circular arc patterns. That is, for each of detected circle or circular arc patterns, it is checked whether at least one peak point of brightness exists in the inside area thereof. Circle or circular arc patterns containing no peak point of brightness in the inside area, if any, are deleted from data.

Figure 17B:
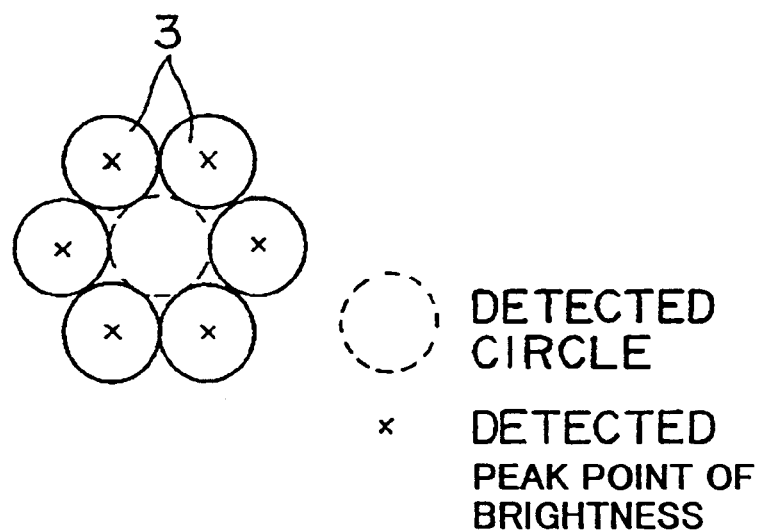

By this arrangement, as shown in FIG. 17B, for example, if a circle or circular arc pattern surrounding the outside area of a sphere 3 is detected incorrectly, the circle or circular arc pattern can be discarded. That is, if a circle pattern indicated by a circle of a dashed line is detected, it can be discarded as invalid detection.

Also in the case of checking for invalid detection of circle or circular arc patterns, for example, arrangements can also be made so that it is checked whether a peak point of brightness exists in the central portion of a circle or circular arc pattern. By this process, even if a peak point of brightness due to noise happens to exist in the inside of a circle or circular arc pattern detected incorrectly, if it is not in the central position of the circle or circular arc pattern, it can be determined that the circle or circular arc pattern was detected incorrectly, so that processing is performed more correctly.

After checking the correspondences between peak points of brightness and circle or circular arc patterns as described above, in the next step S25, peak points of brightness are successively selected, and further, in the next step S26, as shown in FIG. 16C, for example, of pixels adjacent to the selected peak point of brightness, the pixels of a threshold value t2 or more are successively painted, wherein t2 is higher than the brightness level of a low brightness area in the circumferential portion of the sphere and lower than the brightness level of the outside of the sphere.

At this time, in this variant example, in step S26, it is checked whether the pixel to be painted is in the inside of a detected circle or circular arc pattern, and only when so, the pixel is painted.

This prevents adjacent pixel painting processing from extending to the outside of a sphere because part of the circumferential portion of the sphere does not become sufficiently dark due to the presence of bubbles or other defects within the sphere or the presence of noise in the image.

Next, for the painted pixel, further, the brightness of adjacent pixels is determined, and the adjacent pixels are also painted in the same way if the brightness thereof is t2 or more and the pixels are in the inside of one of detected circle or circular arc patterns.

In the next step S27, it is determined whether adjacent pixel painting processing has been performed for all peak points of brightness having a correspondence with circle or circular arc patterns, and if not so, the next peak point of brightness is selected as shown in FIG. 16D, for example, to perform the same adjacent pixel painting processing.

FIG. 16E shows the brightness distribution of image data having been subjected to painting processing with respect to all peak points of brightness having a correspondence with circle or circular arc patterns in the third embodiment including the above-described variant example.

When the painting processing terminates, in step S28 of FIG. 15, the same binarizing processing as in the first and second embodiments described above is performed using a threshold value t3 higher than t2 and lower than the brightness level of the outside of the sphere, as shown in FIG. 16F, for example.

As a result of the binarizing processing, image data of a brightness distribution as shown in FIG. 16G, for example, is obtained. FIG. 16H shows a corresponding sphere disposition.

As described in the first and second embodiments, also in the third embodiment, to eliminate spheres in the outer frame portion of an image range observed, before performing the binarizing processing, the image can be reduced in size after the painting processing.

Next, also in the third embodiment, like the above-mentioned first and second embodiments, in step S29 of FIG. 15, a filling percentage (space filling percentage) is calculated from the obtained binary image. The calculation results are outputted in the next step S30.

Of course, the binary image itself can be outputted aside from calculating a filling percentage or without calculating a filling percentage.

As described above, according to the third embodiment, the same effect as in the above-mentioned first embodiment is obtained and besides only peak points of brightness having a correspondence with circle or circular arc patterns are selected as peak points of brightness used for adjacent pixel painting processing, contributing to the prevention of failures such as the outside area of a sphere painted due to a peak point of brightness detected as noise in the outside area of the sphere, so that more accurate measurements can be performed.

Next, referring to FIG. 18, a description will be made of an image processing method according to a fourth embodiment of this invention.

Figure 18:
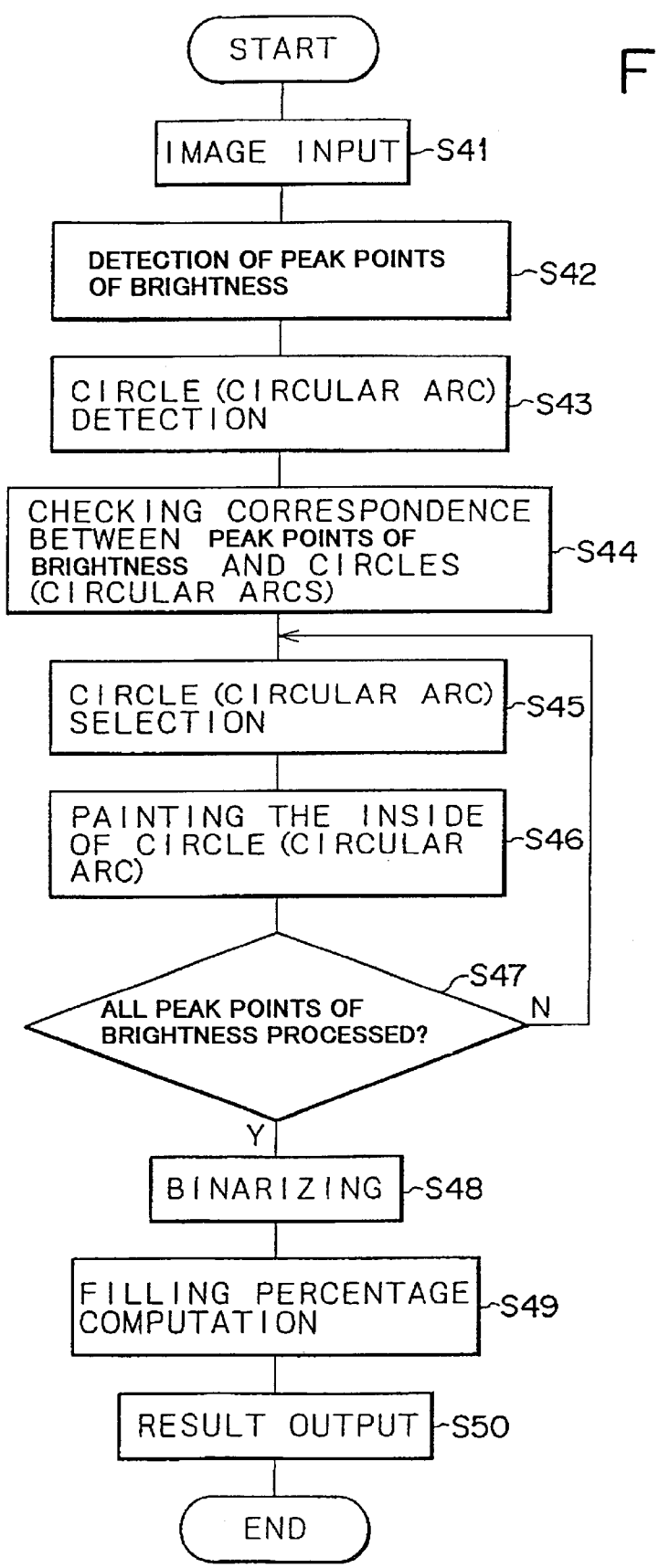
FIG. 18 is a flowchart showing the procedure of an image processing method according to a fourth embodiment of this invention.

FIG. 18 shows the flowchart of a processing procedure according to the fourth embodiment. In step S41, like the above-mentioned first to third embodiments, image data to be processed is inputted.

Next, like the above-mentioned third embodiment, peak points of brightness are detected in step S42, and in the next step S43, circle or circular arc patterns are detected. The order of the detection of peak points of brightness and the detection of circle or circular arc patterns can be reversed.

Next, in step S44, the correspondences between the detected peak points of brightness and circle or circular arc patterns are checked. In the fourth embodiment, as described in the above-mentioned variant example of the third embodiment, for example, a check has only to be made for invalid detection for each of detected circle or circular arc patterns. Specifically, for each of detected circle or circular arc patterns, it is checked whether at least one peak point of brightness exists in the inside area thereof. Circle or circular arc patterns containing no peak point of brightness in the inside area, if any, are deleted from data.

Of course, as an alternative to checking for invalid detection of circle or circular arc patterns, for example, it may also be checked whether a peak point of brightness exists in the central portion of a circle or circular arc pattern.

Next, for each of circle or circular arc patterns having a correspondence with the peak points of brightness, like the above-mentioned second embodiment, the inside area thereof is painted.

That is, in step S45, circle or circular arc patterns are successively selected, and in the next step S46, all pixels in the inside area of the selected circle or circular arc are painted.

In the next step S47, it is determined whether inside area painting processing has been performed for all circle or circular arc patterns having a correspondence with the peak points of brightness, and if not so, the next circle or circular arc pattern is selected to perform the same inside area painting processing.

When the painting processing terminates, the same binarizing processing as in the first to third embodiments described above is performed in step S48.

Also in the fourth embodiment, to eliminate spheres in the outer frame portion of an image range observed, before performing the binarizing processing, the image can be reduced in size after the painting processing.

Next, also in the fourth embodiment, like the above-mentioned first and third embodiments, in step S49, a filling percentage (space filling percentage) is calculated from the obtained binary image. The calculation results are outputted in the next step S50.

Of course, the binary image itself can be outputted aside from calculating a filling percentage or without calculating a filling percentage.

According to the fourth embodiment described above, almost the same effect as in the third embodiment described above can be obtained by a relatively simple procedure.

Next, referring to FIGS. 19 and 20A to 20D, a description will be made of an image processing method according to a fifth embodiment of this invention.

Figure 19:
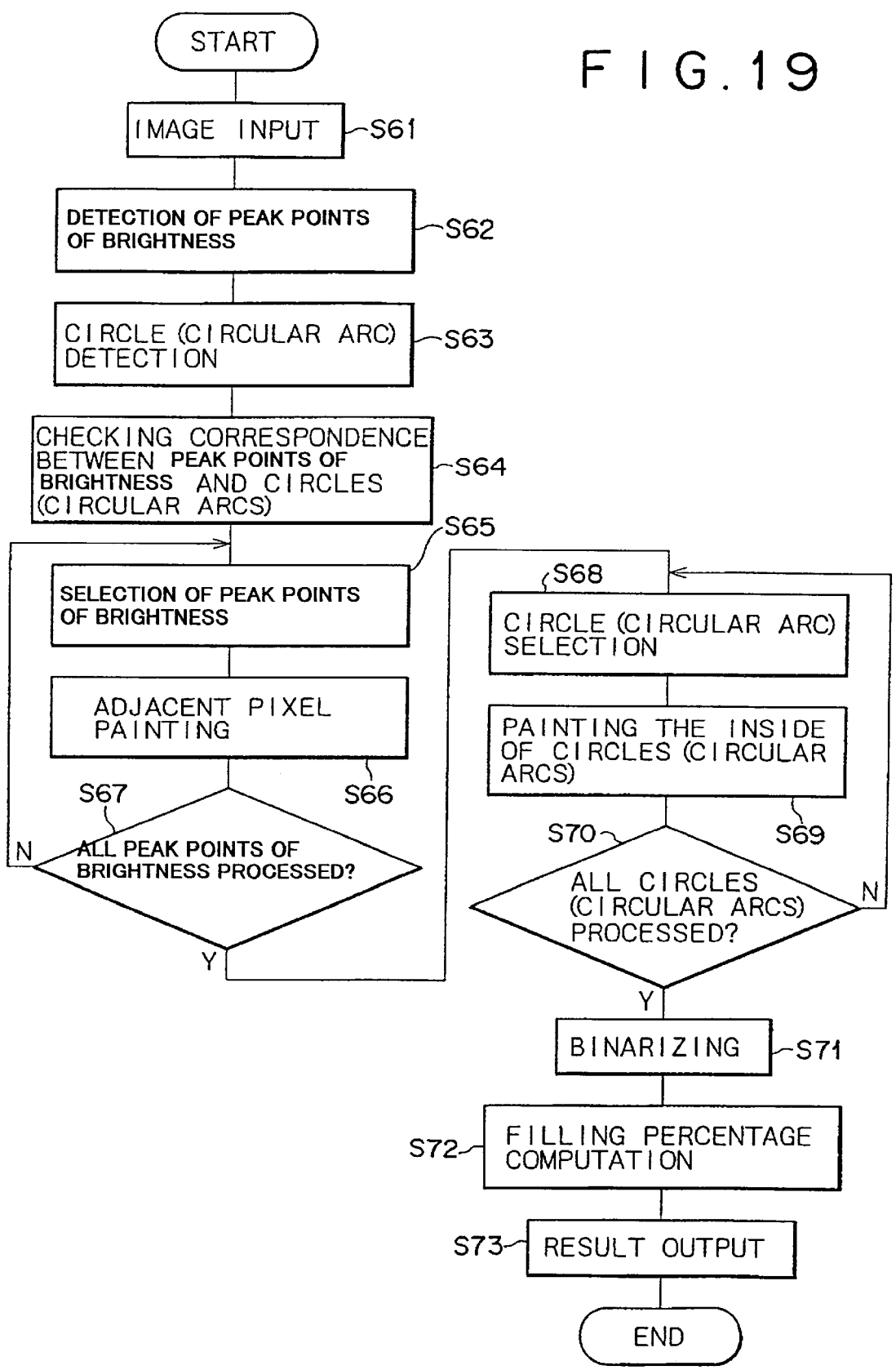
FIG. 19 is a flowchart showing the procedure of an image processing method according to a fifth embodiment of this invention.

FIG. 19 shows the flowchart of a processing procedure according to the fifth embodiment. In step S61, like the above-mentioned first to fourth embodiments, image data to be processed is inputted.

Next, like the above-mentioned third and fourth embodiments, peak points of brightness are detected in step S62, and in the next step S63, circle or circular arc patterns are detected. The order of the detection of peak points of brightness and the detection of circle or circular arc patterns can be reversed.

Next, in step S64, the correspondences between the detected peak points of brightness and circle or circular arc patterns are checked. In the fifth embodiment, like the above-mentioned variant example of the third embodiment, it is checked for each of the detected peak points of brightness whether there is at least one circle or circular arc pattern containing it inside, and also it is checked for each of the detected circle or circular arc patterns whether there is at least one peak point of brightness existing in the inside area thereof. Peak points of brightness not contained in any circle or circular arc pattern, or circular arc patterns containing no peak point of brightness, if any, are deleted from the respective data.

Next, for each of peak points of brightness having a correspondence with the circle or circular arc patterns, like the first embodiment and third embodiment described above, adjacent pixels are painted.

That is, in step S65, peak points of brightness are successively selected, and in the next step S66, of pixels adjacent to the selected peak point of brightness, the pixels of a threshold value t2 or more are successively painted, wherein t2 is higher than the brightness level of a low brightness area in the circumferential portion of the sphere and lower than the brightness level of the outside of the sphere.

For the painted pixel, further, the brightness of adjacent pixels is determined, and the adjacent pixels are also painted in the same way if the brightness thereof is t2 or more.

In the next step S67, it is determined whether adjacent pixel painting processing has been performed for all peak points of brightness having a correspondence with the circle or circular arc patterns, and if not so, the next peak point of brightness is selected to perform the same adjacent pixel painting processing.

Next, in the fifth embodiment, for each of circle or circular arc patterns having a correspondence with the peak points of brightness, like the above-mentioned second and fourth embodiments, the inside area thereof is painted.

That is, in step S68, circle or circular arc patterns are successively selected, and in the next step S69, all pixels in the inside area of the selected circle or circular arc are painted.

In the next step S70, it is determined whether inside area painting processing has been performed for all circle or circular arc patterns having a correspondence with the peak points of brightness, and if not so, the next circle or circular arc pattern is selected to perform the same painting processing.

By performing both painting by a peak point of brightness and painting by a circle or circular arc pattern, the following effect is obtained.

For example, when a circle or circular arc pattern is detected only in a relatively bright portion as shown in FIG. 20A, if only painting by the circle or circular arc pattern is performed, a portion higher in brightness than the threshold value t3 used for binarizing processing may remain within a sphere, as shown in FIG. 20D. Accordingly, in this case, by performing painting by a peak point of brightness detected in the inside of the circle or circular arc pattern at the same time, a portion of the threshold value t2 or greater is painted surely, so that the above-mentioned failure will be prevented.

On the other hand, as shown in FIG. 20C, when a locally bright portion not continuous with a peak point of brightness exists in the inside area of a circle or circular arc pattern, if only painting by the peak point of brightness is performed, the locally bright portion may remain as shown in FIG. 20D. Accordingly, in this case, by performing painting by the circle or circular arc pattern at the same time, the inside area of the circle or circular arc pattern is painted surely, so that the above-mentioned failure will be prevented.

The order of painting by peak points of brightness and painting by circle or circular arc patterns can be reversed.

When the painting processing terminates, in step S71 of FIG. 18, the same binarizing processing as in the first to fourth embodiments described above is performed using a threshold value t3 higher than t2 and lower than the brightness level of the outside of the sphere, for example.

Also in the fifth embodiment, to eliminate spheres in the outer frame portion of an image range observed, before performing the binarizing processing, the image can be reduced in size after the painting processing.

Next, also in the fifth embodiment, like the above-mentioned first and fourth embodiments, in step S72, a filling percentage (space filling percentage) is calculated from the obtained binary image. The calculation results are outputted in the next step S73.

Of course, the binary image itself can be outputted aside from calculating a filling percentage or without calculating a filling percentage.

In the fifth embodiment, more accurate measurements can be performed than in the third and fourth embodiments described above.

In the third to fifth embodiments described above, the correspondences between peak points of brightness and circle or circular arc patterns can also be checked in the following way.

For example, after a plurality of peak points of brightness are detected within an image, for each of the detected peak points of brightness, an area in a proper range (e.g., square having sides of a length that is about twice an estimated diameter of sphere) with the peak point of brightness as a center is allocated in the image and a check is made to see if a circle or circular arc pattern can be detected within the area. When no circle or circular arc pattern cannot be detected, the data of the peak point of brightness is discarded assuming that noise was detected erroneously as a peak point of brightness.

For example, after a plurality of circle or circular arc patterns are detected within an image, for each of the detected circle or circular arc patterns, a check is made to see if a peak point of brightness can be detected in the circle or circular arc pattern, particularly in the central portion thereof. When no peak point of brightness cannot be detected, the data of the circle or circular arc pattern is discarded regarding as invalid detection.

Figure 21:
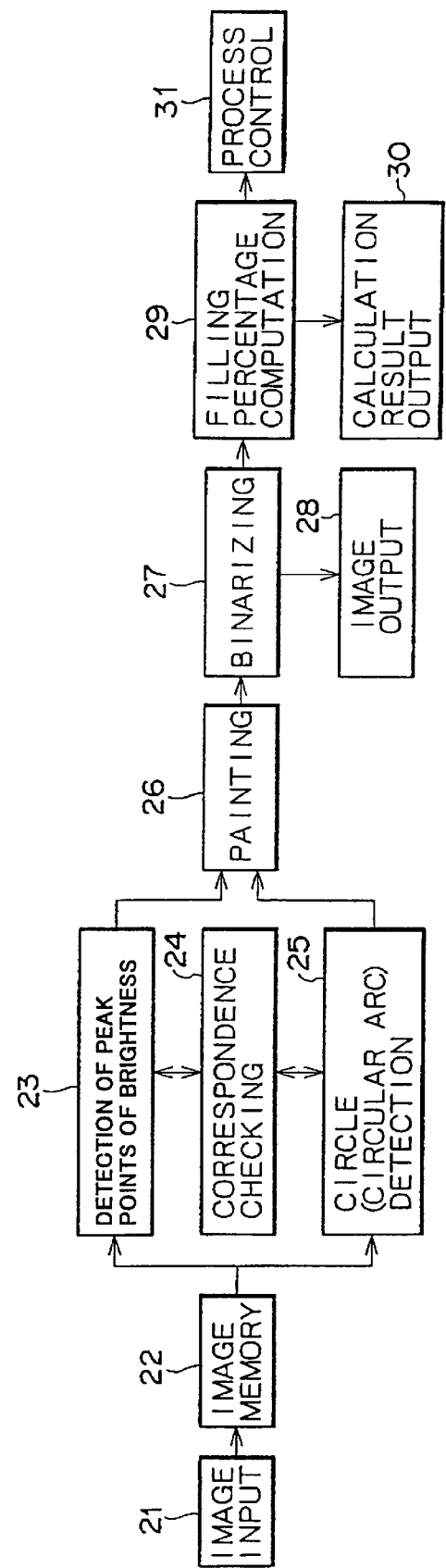
FIG. 21 is a functional block diagram of an apparatus for executing an image processing method of this invention.

FIG. 21 shows a functional block diagram of an apparatus for implementing an image processing method according to the first to fifth embodiments described above.

For example, image data inputted from the image input means 21 such as the imaging device 11 (see FIG. 8A) and the image scanner 13 (see FIG. 8B) already described is temporarily stored in the image memory 22 such as a bit map memory, for example.

The brightness peak point detecting means 23 detects peak points of brightness from the image data read from the image memory 22 according to the method described in the first embodiment, for example. On the other hand, the circle (circular arc) detecting means 25 detects circle or circular arc patterns from the image data read from the image memory 22 according to the method described in the second embodiment, for example.

The correspondence checking means 24, as described in the third to fifth embodiments, checks the correspondences between the peak points of brightness detected by the brightness peak point detecting means 23 and the circle or circular arc patterns detected by the circle (circular arc) detecting means 25, and discards data having no correspondence, for example.

The painting means 26 performs adjacent pixel painting processing based on data of peak points of brightness supplied from the brightness peak point detecting means 23 and inside area painting processing based on circle or circular arc pattern data supplied from the circle (circular arc) detecting means 25.

The binarizing means 24, as described in the first to fifth embodiments, binarizes image data painted in a proper area by the painting means 26 to produce binary image data.

The binary image data, which is outputted from the image output means 28 such as printer and display, is used for intuitive judgment and measurement of a filling degree or setting of various parameters for image processing.

Binary data from the binarizing means 27 is supplied to the filling percentage computation means 29, where a filling percentage (space filling percentage) of sphere disposition is calculated by calculating the number of pixels, for example. The calculation results are outputted from the calculation result output means 30 such as printer, for example.

The calculation results of a filling percentage obtained by the filling percentage calculation means 29 can also be directly supplied to the process control means 31, for example, where it is also possible to automatically control the process of manufacturing planer lenses, for example.

In the above-mentioned embodiments, further different variants can be taken.

For example, for one observed image, to perform painting processing and other operations, two duplications of the image are prepared: one is used to successively paint the portions of peak points of brightness and circle or circular arc patterns already detected with the same brightness as in the outside of spheres to make it easy to detect the peak points of brightness and circle or circular arc patterns, and the other is used to produce a binary image to distinguish between the inside and the outside of spheres.

A specific example will be described. For example, the sensitivity of detecting peak points of brightness is graded, and in FIG. 11B, for example, peak points of brightness are detected in a condition of t1, which is a relatively high value. In this case, several peak points of brightness would not be actually detected. Accordingly, one of duplicated images is used for detection and the other is used to produce a binary image. First, for each of peak points of brightness detected in the above condition, the latter is used to perform painting processing according to the embodiments already described and produce a binary image for distinguishing between the inside and the outside of sphere. On the other hand, on the image for detection, the portions of peak points of brightness detected in the above condition are painted with the same brightness as in the outside of sphere. The image for detection after being painted is used to detect peak points of brightness in a condition of a little smaller t1. As a result, peak points of brightness not detected in the first condition are newly detected. For each of the peak points of brightness newly detected, using the other image, painting processing according to the embodiments already described is performed to update the binary image for distinguishing between the inside and the outside of sphere. After this, using the image for detection, the portions of the peak points of brightness newly detected are painted with the same brightness as in the outside of sphere, for example, and t1 is made further smaller to detect peak points of brightness. By repeating this procedure, a binary image for distinguishing between the inside and the outside of sphere is finally obtained on the other image.

This method is effective, for example, for cases where illumination is not uniform depending on places and the brightness of peak points of brightness is observed differently depending on places.

Besides using images observed in one observation condition, for example, two images having an identical vision field, produced by switching between reflection illumination and penetration illumination, can also be used differently for the detection of peak points of brightness, and circle or circular arc patterns, and the creation of binary images for distinguishing the inside and the outside of sphere, for example.

Further, for example, there can also be used images produced under both reflection illumination and penetration illumination at the same time while changing the respective conditions. Of course, under both illuminations, two images having an identical vision field, which have different illumination conditions, respectively, can be used differently for different uses.

Further, observation conditions determining the brightness of peak points of brightness, the brightness of the outside of sphere, etc. can be changed variously by an operator viewing the images actually observed.

Further, the setting of the observation conditions can be adapted so that they are automatically determined from the images actually observed.

Figure 22:
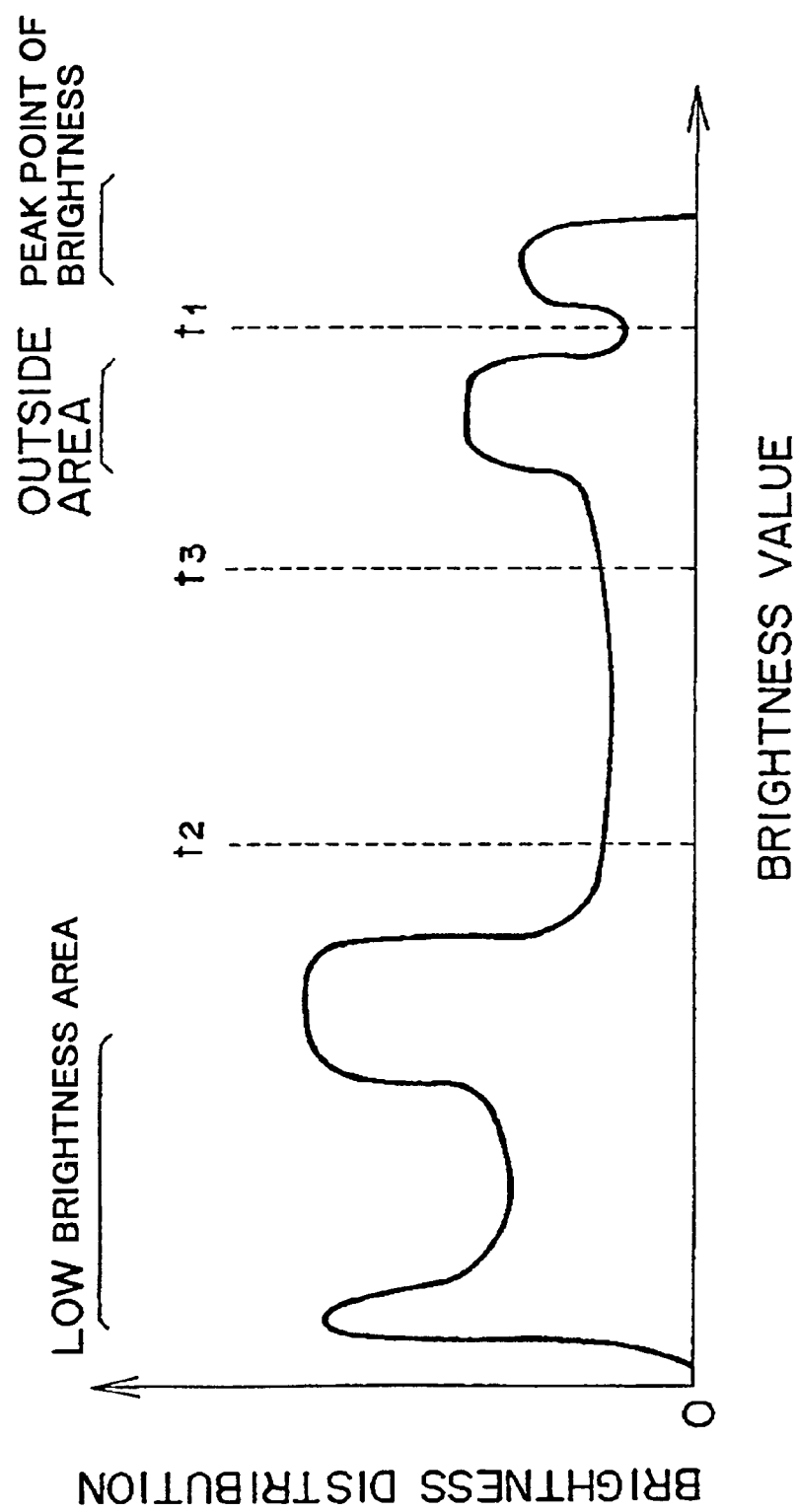
FIG. 22 is a graph showing a histogram of image data.
Figure 23:
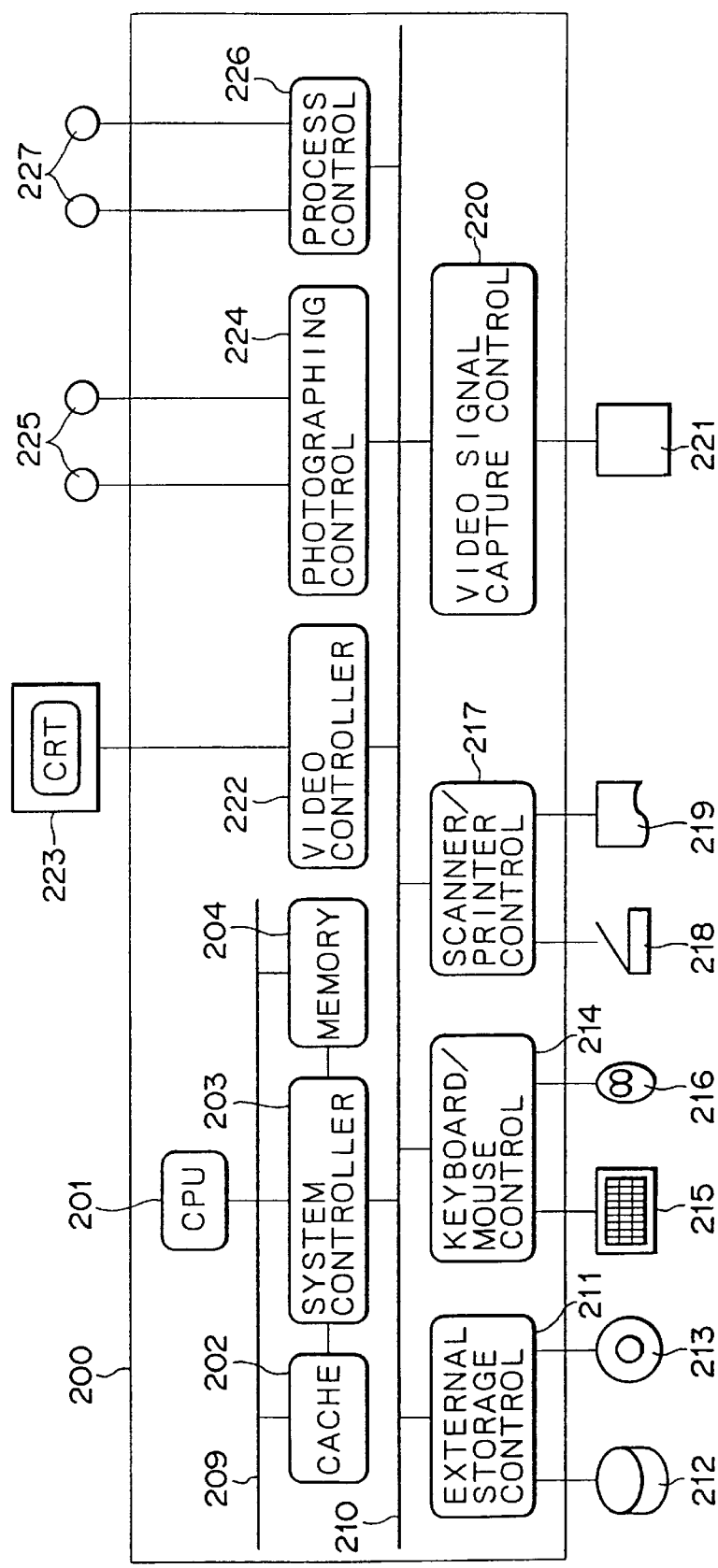
FIG. 23 is an example of hardware configuration for performing image processing according to this invention.

For example, using a histogram of an observed image as shown in FIG. 22, arrangements can be made so that a threshold value t1 is set as the brightness of a valley between the outside area of sphere and a peak point of brightness, a threshold value t2 as brightness a little higher than in a low brightness area, and a threshold value t3 as brightness a little smaller than in the outside area of sphere. The respective threshold values can be automatically set by calculating the maximum and minimum points of a histogram curve, for example.

Alternatively, when only the maximum and minimum values of brightness in an observed image are found, the maximum portion and the minimum portion of brightness can be roughly regarded as a peak point of brightness and a circle or circular arc pattern, respectively, whereby the distinction between the inside and the outside of sphere is made roughly, so that the brightness of the outside of sphere can be determined to set threshold values.

Further, for example, when the brightness distribution of brightness of an observed image is unbalanced, by normalizing the brightness distribution using the maximum and minimum values of the observed image, the distinction between a peak point of brightness, a low brightness area in the circumferential portion of sphere, and other areas can be made easy.

Further, for example, by changing a gamma curve, offset, gain, etc. to adjust gradation characteristics, contrast can be enhanced to make it easy to distinguish between a peak point of brightness, a low brightness area in the circumferential portion of sphere, and other areas.

Further, for example, by performing equalizing processing by use of the above-mentioned histogram, the distinction between a peak point of brightness, a low brightness area in the circumferential portion of sphere, and other areas can be made easy.

Further, for example, the influence of noise in an observed image can be reduced by reducing image noise by a median filter or the like.

Further, for example, by performing image operations (arithmetic operations among images, maximum and minimum operations, etc.) on a plurality of images produced under different illumination conditions, images with enhanced peak points of brightness, low brightness areas, etc. can be produced and used.

FIG. 22 shows an example of hardware configuration for performing image processing according to this invention.

A computer 200 is, for example, a commercially available, so-called general purpose computer provided with a photographing control section, an image memory, etc.

CPU 201 controls the overall apparatus and performs a variety of operations; for example, Intel's Pentium (trademark), etc. can be used.

Cache memory 202, which is a storage having short access time placed between the CPU 201 and main storage, speeds up the overall system by putting part of information of main storage in the cache memory 202.

A system controller 203 adjusts the timing among the CPU 201, cache memory 202, memory 204, and computer buses 209 and 210. Intel's TRITON (430FX: trademark), etc. can be used, for example.

Memory 204, which is a main storage comprising DRAM and the like, for example, is used to write and read information according to directions from the CPU 201 or the system controller 203. It also functions as an image memory for storing image data of this invention.

The host bus 209 is information transfer means directly connected to the CPU 201 and allows rapid information exchange with the cache memory 202, the system controller 203, etc.

A PCI bus 210 is information transfer means separated from the host bus 209 and is used to transfer information between the system controller 203 and a variety of terminals.

An external storage control section 211 is an input-output interface provided between the PCI bus 210 and external storage units such as hard disk drive 212 and CD-ROM drive 213, and controls the reading and writing of information from and to the external storage units. These external storage units can be connected by SCSI, IEEE1394, etc., for example. As the external storage units, a floppy disk drive and a magneto-optical disk, for example, in addition to the above-mentioned hard disk drive 212 and CD-ROM drive, are available. Image data in the middle of processing or after processing, for example, can be stored in these external storage units.

A keyboard/mouse control section 214 is an input interface for connecting a keyboard 215, a mouse 216, which is a pointing device, and the like to the PCI bus 210. Various types of information can be inputted by the keyboard 215, mouse 216, etc.

A scanner/printer control section 217 is an input interface for connecting an image scanner 218, which is an image input unit, a printer 219, which is an image output unit, and the like to the PCI bus 210. These units are commonly connected by SCSI, IEEE1394, and the like, for example.

An video signal capture control section 220, which is provided between an video signal source 221 comprising imaging devices such as CCD and the PCI bus 210, converts video signals sent as analog signals, for example, into digital video signals. The video signal capture control section 220 can contain an image memory such as a bit map memory, for example, in which case inputted image data is stored in the memory 204 through the image memory of the video signal capture control section 220 or PCI bus 210. Video signals inputted can be DV data on IEEE1394, and digital video signals such as MPEG-1 and MPEG-2 connected by a network such as IEEE802.3 (Ethernet), FDDI, ATM, and IEEE1394, in addition to analog video signals such as NTSC and CCIR Rec. 709 (so-called HDTV), and digital video signals such as D-1 and D-2, for example.

A video controller 222, which is provided between the PCI bus 210 and a display unit 223 such as CRT, expands sent image data on a bit map memory within the video controller 222 and displays its contents by the display unit 223. The video controller 222 complies with VESA DDC (display data channel) specifications, for example, and can present and receive device characteristic information stored in the display unit 223 such as CRT.

The display unit 223, which displays image data, can be PDP (Plasma Display Panel), a liquid crystal display, or the like, for example, as well as CRT.

A photographing control section 224, which is provided between the PCI bus 210 and photographing control features 225, according to directions from the CPU 201 and the like, controls a variety of photographing control features 225, for example, such as X-Y stage of microscopes, Z stage for adjusting focus, switching between reflection illumination and penetration illumination, adjustment of illumination luminosity.

A process control section 226, which is provided between the PCI bus 210 and process control features 227 as part of a manufacturing method and a manufacturing apparatus described later, according to directions from the CPU 201 and the like, controls a variety of process control features 227, for example, such as control of the number of spheres 3 supplied per unit space from a hopper 42 (see FIG. 24(*c*)), squeezing speed and height control by doctor plates 43 (see FIG. 24(*d*)), control of pressure onto spheres 3 by a pressure roller 44 (see FIG. 25(*a*)), and the elimination of defective items from processes in a defect detecting process and the canceling of processes.

Hereinbefore, a description has been made roughly of a computer configuration for performing image processing according to this invention. However, image processing according to this invention, without being limited to the example, could also be performed by other apparatuses which can perform operations on the described image processing and input and output image data, for example, those that contain analog circuits such as transistors and operational amplifiers, and digital circuits such as TTL, PLD, and gate array.

Referring to FIGS. 24A to 27D, a description will be made of a method for manufacturing a planer lens to which a method for measuring sphere disposition according to this invention is applied.

Figure 24A:
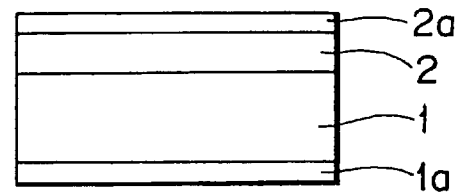
FIGS. 24A to 24D are schematic cross-sectional views that show a method for manufacturing a planer lens to which this invention is applied, in the order of process.

As shown in FIG. 24A, a transparent adhesive layer 2 is formed on a transparent substrate 1 of the light input side. For example, an acrylic ultraviolet (UV) hardening resin coated with a protection film 2*a* is stuck onto a transparent substrate 1 formed from acrylic resin such as polymethyl methacrylate (PMMA), for example. The reference numeral 1*a* denotes a protection film for protecting the back of the transparent substrate 1.

Figure 24B:
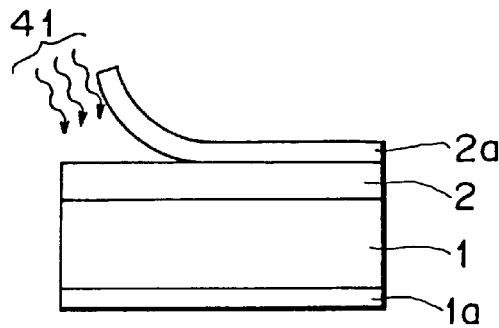

Next, as shown in FIG. 24B, the protection film 21 is stripped from the transparent adhesive layer 2 while neutralizing static electricity by a discharging blow 41 and removing dust by suction.

Figure 24C:
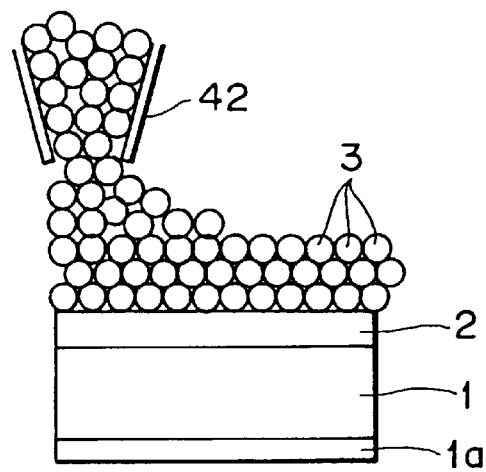

Next, as shown in FIG. 24C, a large number of transparent minute spheres 3 are supplied onto the transparent adhesive layer 2 from a hopper 42, for example.

Figure 24D:
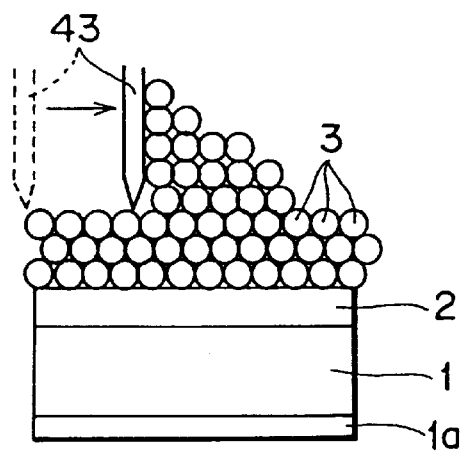

Next, as shown in FIG. 24D, the height of the transparent minute spheres 3 is evened by performing squeezing by a doctor plate 43, for example.

Figure 25A:
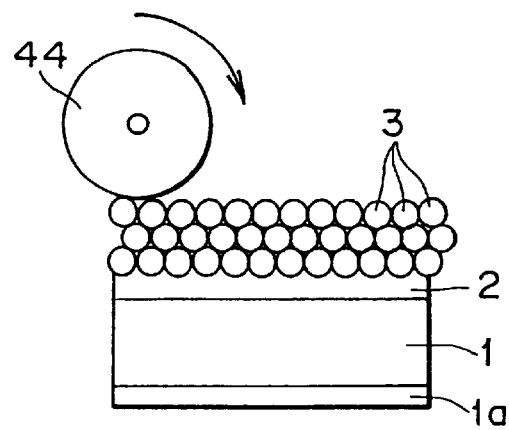
FIGS. 25A to 25D are schematic cross-sectional views that show a method for manufacturing a planer lens to which this invention is applied, in the order of process.

Next, as shown in FIG. 25A, the transparent minute spheres 3 are pressed from top by the pressure roller 44 such as a silicon rubber, for example, so that the transparent spheres 3 at the lowest layer are embedded in the transparent adhesive layer 2 by about 50% of the diameter thereof, for example.

In this example, although the pressing roll 44 is used as means for pressing the spheres 3, any materials that can press the spheres 3 can be used; for example, flexible materials such as silicon rubber, and the surface of rigid plates such as metallic plates may be pressed in parallel, or wedge plates may be pressed slantingly.

Figure 25B:
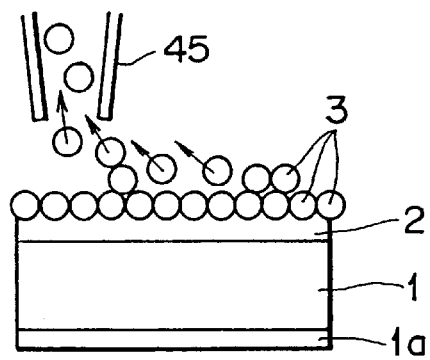

Next, as shown in FIG. 25B, extra transparent minute spheres 3, without being embedded and held in the transparent adhesive layer 2, are sucked and removed by a vacuum suction means 45.

Figure 25C:
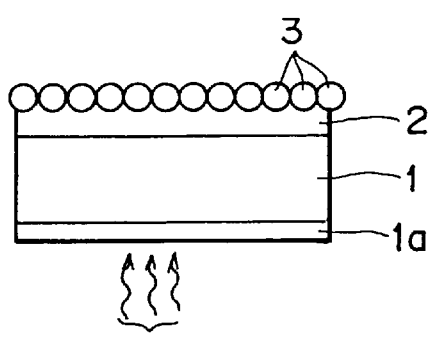

Next, as shown in FIG. 25C, the transparent adhesive layer 2 formed from ultraviolet hardening resin is hardened by ultraviolet irradiation 46 to secure the transparent minute spheres 3.

Figure 25D:
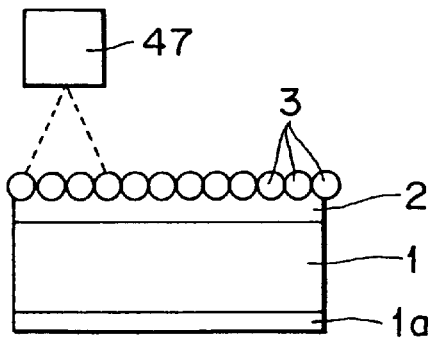

Next, as shown in FIG. 25D, the disposition of the transparent minute spheres 3 is imaged by a camera 47, image processing according to this invention is performed, and the disposition of the transparent minute spheres 3, for example, the space filling percentage thereof is measured.

In order that a satisfactory disposition of the transparent minute spheres 3 is obtained, the processes are recursively controlled based on the obtained results, for example, by changing the number of spheres 3 supplied per unit space from the hopper 42 shown in FIG. 24C, the speed and height of squeezing by the doctor plate 43 shown in FIG. 24D, or pressure applied from the pressure roller 44. Or the obtained measurement results can be merely used to check defective products. In this case, for example, products having a filling percentage of 50% or more, preferably products of the same filling percentage or greater as the above-mentioned square close-packed structure can be regarded as conforming products.

Performing measurements at a plurality of positions on a sample helps to detect defects occurring at unexpected positions, besides finding the overall average filling percentage.

Next, as shown in FIG. 26A, light absorption material 4 such as carbon toner is supplied onto the transparent minute spheres 3 from a hopper 48, for example. Subsequently, although the figure is omitted, the light absorption material 4 is pressed by a pressing roll or the like into the gaps among the transparent minute spheres 3.

Next, as shown in FIG. 26B, the light absorption material 4 on the transparent minute spheres 3 is removed by a mop 49, cloth, or the like, for example, to expose a portion near the top of each transparent minute sphere of the light output side.

Next, as shown in FIG. 26C, the filling status of the light absorption material 43 is checked by a camera 50, for example.

Next, as shown in FIG. 27A, the protection film 5*a* on the transparent adhesive layer 5 formed on the transparent substrate 6 of the light output side is stripped and stacked on the transparent minute spheres 3 and the light absorption layer 4 formed on the transparent substrate 1 of the light input side, as described above. The reference numeral 6*a* denotes a protection film placed on the reverse side of the transparent substrate 6.

As the transparent substrate 6 and the transparent adhesive layer 5 of the light output side, the same materials as the transparent substrate 1 and the transparent adhesive layer 2 of the light input side described above can be used respectively. For example, the transparent substrate 6 is formed from an acrylic plate and the transparent adhesive layer 5 is formed from acrylic ultraviolet hardening resin.

Then, as shown in FIG. 27B, the transparent substrate 6 is pressed by the pressing roll 51 via the transparent adhesive layer 5 against the transparent minute spheres 3 and the light absorption layer 4 formed on the transparent substrate 1.

After this, as shown in FIG. 27C, the transparent adhesive layer 5 is hardened by ultraviolet irradiation 52 to strengthen the junction.

Figure 28A:
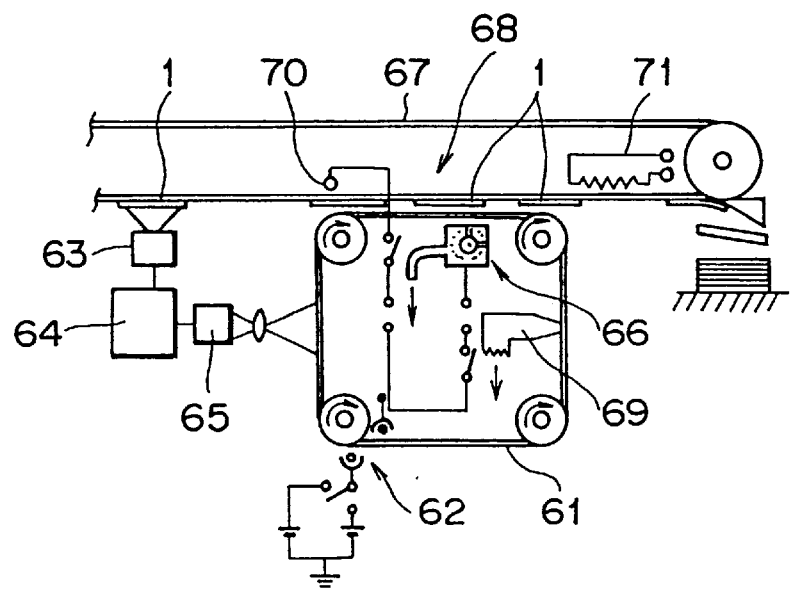
FIGS. 28A and 28B are schematic cross-sectional views another method for manufacturing a planer lens to which this invention is applied.
Figure 28B:
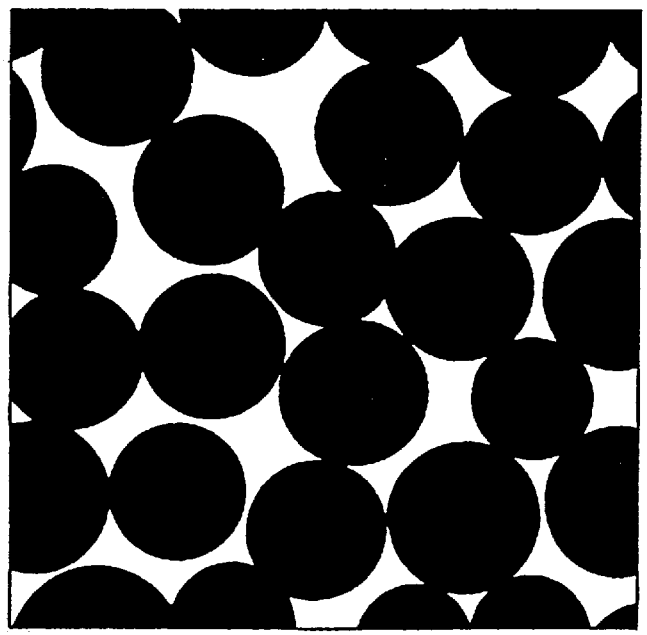

FIGS. 28A and 28B show another method for manufacturing a planer lens.

According to this method, for example, as shown in FIG. 28A, an endless photoconductive screen 61 is used to form a light absorption layer continuously on a plurality of transparent substrates 1 that hold a large number of transparent minute spheres (not shown).

If the photoconductive screen, which is coated with a photoconductive film, is wholly charged by corona discharge at a location indicated by the reference numeral 62 and then is irradiated in an arbitrary image pattern with light, locations on which the light hits go into a not-charged state because static electricity is neutralized, so that an electrostatic latent image of a pattern corresponding to the image is formed on the screen. Charged portions on the screen repel powder of the same polarity and interfere with opening passage thereof. On the other hand, since not-charged portions permit opening passage of powder, an adherent image corresponding to the image is obtained if painting is performed by the coating powder through the screen.

Accordingly, according to the above-mentioned imaging method of this invention, a picture on a target substrate 1 is imaged by an imaging section 63 and the image data is subjected to image processing by an image processing section 64, and a binary image showing the disposition of transparent minute spheres on the substrate 1 is obtained as shown in FIG. 28B. An image corresponding to the binary image is projected on the photoconductive screen 61 from an image projection section 65, and an electrostatic latent image corresponding to the disposition of the transparent minute spheres on the target substrate 1 is formed on the photoconductive screen 61.

Arrangements are made so that when the target substrate 1 is conveyed to a print stage 68 by a belt conveyer 67, for example, the photoconductive screen 61 on which the corresponding electrostatic latent image is formed arrives in the print stage 68, and in that state, toner powder is supplied from a toner supply section 66 and a light absorption layer is formed on the substrate 1.

By doing so, toner powder can substantially be supplied only to the gaps among the transparent minute spheres on the substrate, so that the filling can be performed very efficiently. Also, since toner powder can be supplied correspondingly to the disposition of actual transparent minute spheres on each substrate 1, the filling of the gaps among the transparent minute spheres can always be performed correctly.

In FIG. 28A, the reference numeral 69 denotes a cleaner for cleaning toner powder off the photoconductive screen 61, 70 denotes a bias roller for presenting bias potential to each substrate 1, and 71 designates a heater for heating the toner of the optical absorption layer to harden it as required.

Hereinbefore, a description has been made of the preferred embodiments of this invention, but this invention is not limited only to the above-mentioned embodiments.

For example, although planer lenses used with translucent screens have been described in the above-mentioned embodiments, disposing transparent minute spheres in high density is also seen in, for example, screens for front projectors (reflection or front projection projectors), further reflection display plates of traffic signs, etc., and reflection sheets attached to clothing, etc. and this invention is also applicable to these manufacturing processes.

Spheres whose disposition status is to be displayed or measured need not necessarily be transparent. In the case of opaque spheres, it is possible to form a peak point of brightness brighter than the circumferential portion thereof at the central portion thereof by reflection illumination. In this case, the brightness of the outside of the spheres can be adjusted by coloring the background.

From image data obtained by photographing while illuminating a plurality of spheres disposed in a single layer in a substantially plane shape, this invention detects peak points of brightness brighter than the outside of the spheres, formed in the inside of each sphere by illumination, for example, or corresponding circle or circular arc patterns in the circumferential portion of each sphere. A proper area of the inside of each sphere is painted using the detected peak point of brightness, or circle or circular arc pattern, and then binarization processing is performed to obtain a binary image for distinguishing between the inside and the outside of the sphere. Accordingly, a binary image for distinguishing between the inside and the outside of spheres, which cannot be obtained by mere binarization processing, can be obtained in a relatively easy way, and the binary image can be used to measure the disposition of spheres by finding a space filling percentage of spheres, for example. The results of measuring a disposition status are fed back to the processes of manufacturing planer lenses, for example, so that the manufacturing processes can be automatically controlled to obtain a satisfactory disposition of spheres.

An imaging method and a measuring method according to this invention can substantially completely automatize the process from observation to the acquisition of measurement results through processing. For example, spheres in an observed image need not be individually specified, so that labor saving and rapid processing and measurements can be achieved.

What is claimed is:

1. A method for manufacturing a planer lens having a single layer in a substantially plane shape, a plurality of transparent spheres being held in an adhesive layer, which includes the step of pressing said plurality of transparent spheres dispersed on the adhesive layer by a pressure means so as to embed said plurality of transparent spheres in the adhesive layer, comprising the steps of:

detecting peak points of brightness from image data obtained by photographing while illuminating said transparent spheres so that a peak point of brightness brighter than the outside area of each sphere is formed in the inside area thereof and a low brightness area darker than the outside area is formed in the circumferential portion thereof;

using a first predetermined value lower than the brightness level of the outside area of said each sphere and higher than the brightness level of said low brightness area in the circumferential portion of said each sphere in said image data, successively painting adjacent pixels having brightness of said first proper value or greater with each of the peak points of brightness detected by said brightness peak point detecting means as a starting point;

binarizing said image data painted in a predetermined area by using a second predetermined value between said first predetermined value and the brightness level of the outside area of said each sphere as a threshold value;

measuring a space filling percentage of said plurality of transparent spheres from the number of white or black pixels of the obtained binary image of said image data; and determining or controlling the disposition of said plurality of transparent spheres based on the measured space filling percentage.

2. A method for manufacturing a planer lens according to claim 1, wherein the pressure to be applied is controlled based on said measured space filling percentage by said pressure means.

3. A method for manufacturing a planer lens according to claim 1, wherein said plurality of transparent spheres are illuminated by reflection illumination.

4. A method for manufacturing a planer lens according to claim 1, wherein said plurality of transparent spheres are illuminated by penetration illumination.

5. A method for manufacturing a planer lens having a single layer in a substantially plane shape, a plurality of transparent spheres being held in an adhesive layer, which includes the step of pressing said plurality of transparent spheres dispersed on said adhesive layer by a pressure means so as to embed said plurality of transparent spheres in said adhesive layer, comprising the steps of:

detecting circle or circular arc patterns of a predetermined size from image data obtained by photographing while illuminating said transparent spheres so that a peak point of brightness brighter than the outside area of each sphere is formed in the inside area thereof and a low brightness area darker than the outside area is formed in the circumferential portion thereof;

painting the inside area of each of the circle or circular arc patterns detected in said image data;

binarizing said image data painted in a predetermined area in accordance with a threshold value lower than the brightness level of the outside area of each sphere and higher than the brightness level of said low brightness area in the circumferential portion of each sphere;

measuring a space filling percentage of said plurality of transparent spheres from the number of white or black pixels of the obtained binary image of said image data; and determining or controlling the disposition of said plurality of transparent spheres based on the measured space filling percentage.

6. A method for manufacturing a planer lens according to claim 5, wherein the pressure to be applied is controlled based on said measured space filling percentage by said pressure means.

7. A method for manufacturing a planer lens according to claim 5, wherein said plurality of transparent spheres are illuminated by reflection illumination.

8. A method for manufacturing a planer lens according to claim 5, wherein said plurality of transparent spheres are illuminated by penetration illumination.

9. A method for manufacturing a planer lens according to claim 5, wherein circle or circular arc patterns smaller than a size estimated from said spheres are detected as said circle or circular arc patterns by pattern matching.

10. A method for manufacturing a planer lens having a single layer in a substantially plane shape with a plurality of transparent spheres being held in an adhesive layer, which includes the step of pressing said plurality of transparent spheres dispersed on said adhesive layer by a pressure means so as to embed said plurality of transparent spheres in said adhesive layer, comprising the steps of:

detecting peak points of brightness from image data obtained by photographing while illuminating said transparent spheres so that a peak point of brightness brighter than the outside area of each sphere is formed in the inside area thereof and a low brightness area darker than the outside area is formed in the circumferential portion thereof;

detecting circle or circular arc patterns of a predetermined size;

checking for the presence of correspondences between said detected peak points of brightness and said detected circle or circular arc patterns using a first predetermined value lower than the brightness level of the outside area of said each sphere and higher than the brightness level of said low brightness area in the circumferential portion of said each sphere in said image data;

successively painting adjacent pixels with each of said peak points of brightness having a correspondence with said circle or circular arc patterns as a starting point, the adjacent pixels having brightness of said first proper value or greater;

binarizing said image data painted in a predetermined area by using a second predetermined value between said first predetermined value and the brightness level of the outside area of said each sphere as a threshold value;

measuring a space filling percentage of said plurality of transparent spheres from the number of white or black pixels of the obtained binary image of said image data; and determining or controlling the disposition of said plurality of transparent spheres based on the measured space filling percentage.

11. A method for manufacturing a planer lens according to claim 10, wherein the pressure to be applied is controlled based on said measured space filling percentage by said pressure means.

12. A method for manufacturing a planer lens according to claim 10, wherein said plurality of transparent spheres are illuminated by reflection illumination.

13. A method for manufacturing a planer lens according to claim 5, wherein said plurality of transparent spheres are illuminated by penetration illumination.

14. A method for manufacturing a planer lens according to claim 10, wherein circle or circular arc patterns smaller than a size estimated from said spheres are detected as said circle or circular arc patterns by pattern matching.

15. A method for manufacturing a planer lens according to claim 10, wherein said image data is binarized by said second predetermined value after the inside area of each of said circle or circular arc patterns having a correspondence with said peak points of brightness is also painted.

16. An apparatus for manufacturing a planer lens having a single layer in a substantially plane shape, a plurality of transparent spheres being held in an adhesive layer, comprising:

pressure means for pressing said plurality of transparent spheres dispersed on said adhesive layer so as to embed said plurality of transparent spheres in said adhesive layer;

illuminating means for illuminating said plurality of transparent spheres so that a peak point of brightness brighter than the outside area of said each sphere is formed in the inside area thereof and a low brightness area darker than the outside area is formed in the circumferential portion thereof;

image input means for inputting image data obtained by photographing said plurality of transparent spheres while illuminating them by said illuminating means;

brightness peak point detecting means for detecting said peak points of brightness from said image data inputted by said image input means;

painting means, using a first predetermined value lower than the brightness level of the outside area of said each sphere and higher than the brightness level of said low brightness area in the circumferential portion of said each sphere in said image data, for successively painting adjacent pixels with each of said peak points of brightness detected by said brightness peak point detecting means as a starting point, the adjacent pixels having brightness of the first predetermined value or greater;

binarizing means for binarizing said image data painted in a predetermined area by said painting means, by using a second predetermined value between said first predetermined value and the brightness level of the outside area of the each sphere as a threshold value;

filling percentage measuring means for measuring a space filling percentage of said plurality of transparent spheres from the number of white or black pixels of the binary image of said image data, obtained by said binarizing means; and control means for determining or controlling the disposition of said plurality of transparent spheres based on the measured space filling percentage obtained by said filling percentage measuring means.

17. An apparatus for manufacturing a planer lens according to claim 16, wherein said control means controls the pressure to be applied by said pressure means.

18. An apparatus for manufacturing a planer lens according to claim 16, wherein illumination by said illuminating means is reflection illumination.

19. An apparatus for manufacturing a planer lens according to claim 16, wherein illumination by said illuminating means is penetration illumination.

20. An apparatus for manufacturing a planer lens having a single layer in a substantially plane shape, a plurality of transparent spheres being held in an adhesive layer, comprises:

pressure means for pressing said plurality of transparent spheres dispersed on said adhesive layer so as to embed said plurality of transparent spheres in said adhesive layer;

illuminating means for illuminating said plurality of transparent spheres so that a peak point of brightness brighter than the outside area of said each sphere is formed in the inside area thereof and a low brightness area darker than the outside area is formed in the circumferential portion thereof;

image input means for inputting image data obtained by photographing said plurality of transparent spheres while illuminating them by said illuminating means;

circle detecting means for detecting circle or circular arc patterns of a predetermined size from said image data inputted by said image input means;

painting means for painting the inside area of each of said circle or circular arc patterns detected by said circle (circular arc) detecting means in said image data;

binarizing means for binarizing said image data painted in a predetermined area by said painting means, by a threshold value lower than the brightness level of the outside area of said each sphere and higher than the brightness level of said low brightness area in the circumferential portion thereof;

filling percentage measuring means for measuring a space filling percentage of said plurality of transparent spheres from the number of white or black pixels of said binary image of said image data, obtained by said binarizing means; and control means for determining or controlling the disposition of said plurality of transparent spheres based on the measured space filling percentage obtained by said filling percentage measuring means.

21. An apparatus for manufacturing a planer lens according to claim 20, wherein said control means controls the pressure to be applied by said pressure means.

22. An apparatus for manufacturing a planer lens according to claim 20, wherein illumination by said illuminating means is reflection illumination.

23. An apparatus for manufacturing a planer lens according to claim 20, wherein illumination by said illuminating means is penetration illumination.

24. An apparatus for manufacturing a planer lens according to claim 20, wherein said circle detecting means detects circle or circular arc patterns smaller than a size estimated from said spheres by pattern matching.

25. An apparatus for manufacturing a planer lens having a single layer in a substantially plane shape, a plurality of transparent spheres being held in an adhesive layer, comprising:

pressure means for pressing said plurality of transparent spheres dispersed on said adhesive layer so as to embed said plurality of transparent spheres in said adhesive layer;

illuminating means for illuminating said plurality of transparent spheres so that a peak point of brightness brighter than the outside area of said each sphere is formed in the inside area thereof and a low brightness area darker than the outside area is formed in the circumferential portion thereof;

image input means for inputting image data obtained by photographing said plurality of transparent spheres while illuminating them by said illuminating means;

brightness peak point detecting means for detecting said peak points of brightness from said image data inputted by said image input means;

circle detecting means for detecting circle or circular arc patterns of a predetermined size from said image data inputted by said image input means;

correspondence judgment means for checking for the presence of correspondence between said peak points of brightness detected by said brightness peak point detecting means and said circle or circular arc patterns detected by said circle detecting means;

painting means, using a first proper value lower than the brightness level of the outside area of said each sphere and higher than the brightness level of said low brightness area in the circumferential portion thereof in said image data, for successively painting adjacent pixels with each of said peak points of brightness having a correspondence with said circle or circular arc patterns as a starting point, the adjacent pixels having brightness of said first predetermined value or greater;

binarizing means for binarizing said image data painted in a proper area by said painting means by using a second predetermined value between said first predetermined value and the brightness level of the outside area of said each sphere as a threshold value;

filling percentage measuring means for measuring a space filling percentage of said plurality of transparent spheres from the number of white or black pixels of said binary image of said image data, obtained by said binarizing means; and control means for determining or controlling the disposition of said plurality of transparent spheres based on the measured space filling percentage obtained by said filling percentage measuring means.

26. An apparatus for manufacturing a planer lens according to claim 25, wherein said control means controls the pressure to be applied by said pressure means.

27. An apparatus for manufacturing a planer lens according to claim 25, wherein illumination by said illuminating means is reflection illumination.

28. An apparatus for manufacturing a planer lens according to claim 25, wherein illumination by said illuminating means is penetration illumination.

29. An apparatus for manufacturing a planer lens according to claim 25, wherein said circle detecting means detects circle or circular arc patterns smaller than a size estimated from said spheres by pattern matching.

30. An apparatus for manufacturing a planer lens according to claim 25, wherein said painting means also paints the inside area of each of said circle or circular arc patterns having a correspondence with said peak points of brightness.

* * * * *